Oct. 21, 1958 R. B. JOHNSON ET AL 2,857,032
DATA RECORDING MACHINE
Filed May 4, 1954 17 Sheets-Sheet 1

REYNOLD B. JOHNSON
JOHN M. HARKER
DAVID W. KEAN
JOHN J. LYNOTT
INVENTORS.

BY John B. Sprousler
AGENT

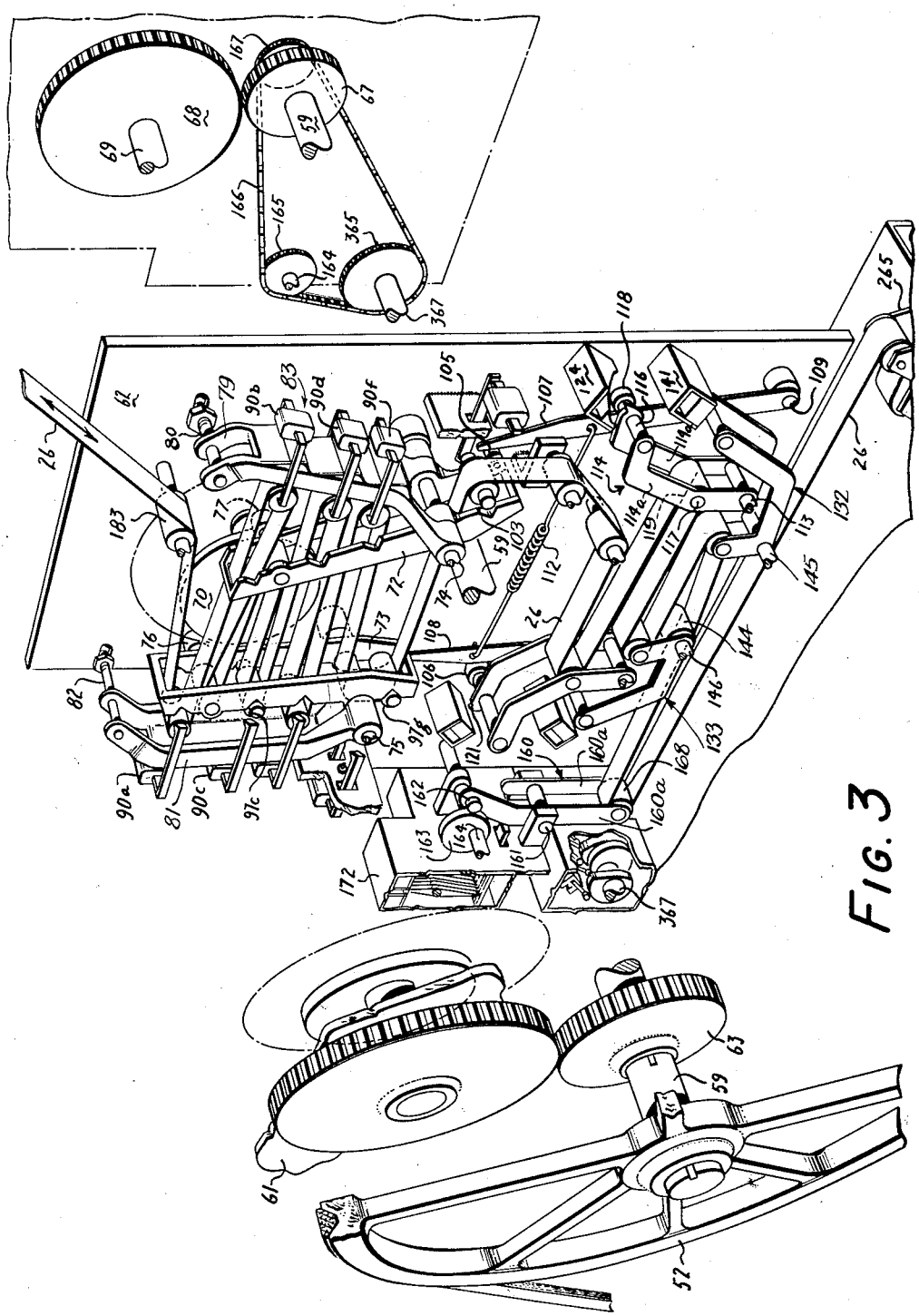

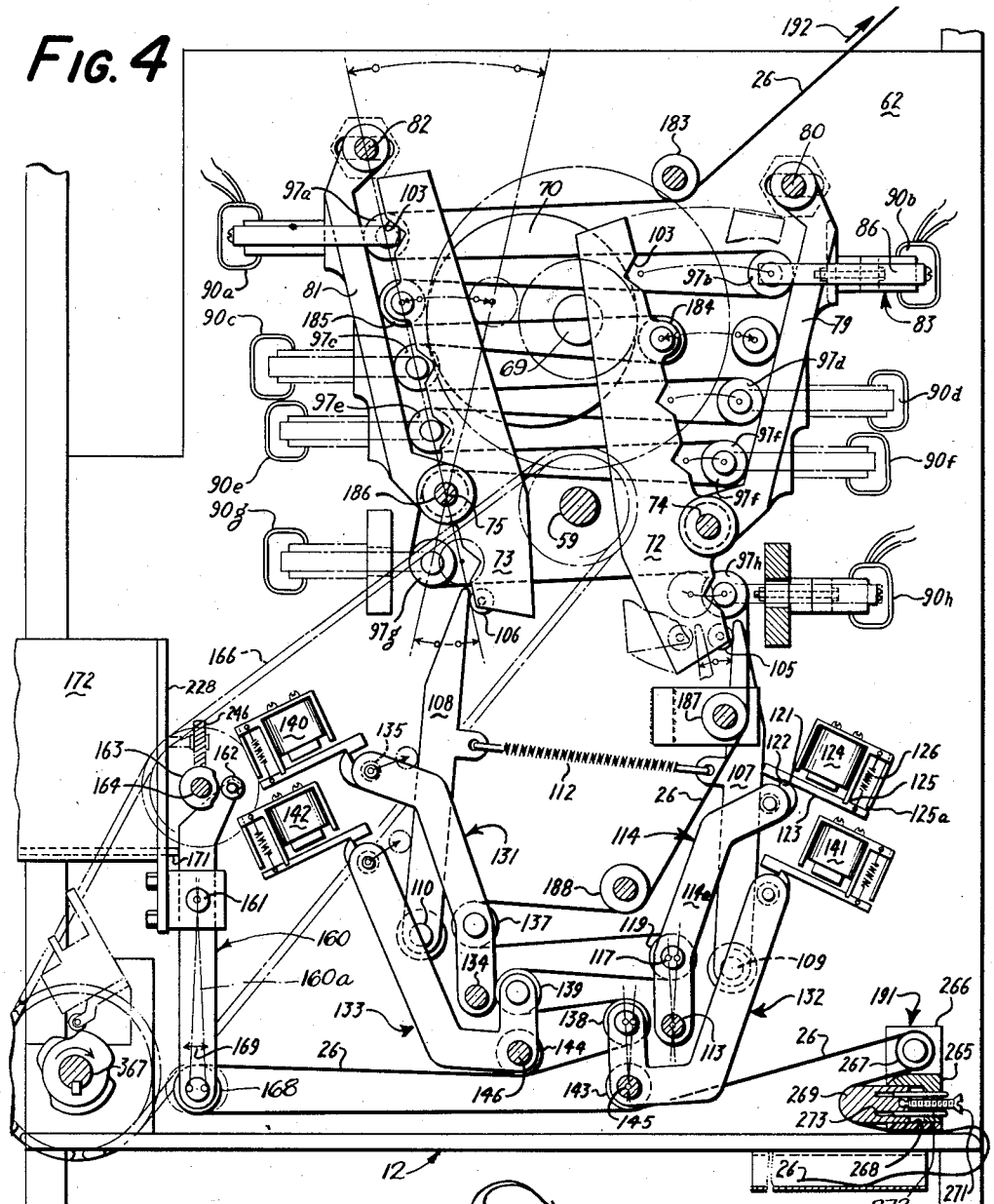

Oct. 21, 1958   R. B. JOHNSON ET AL   2,857,032
DATA RECORDING MACHINE
Filed May 4, 1954   17 Sheets-Sheet 4
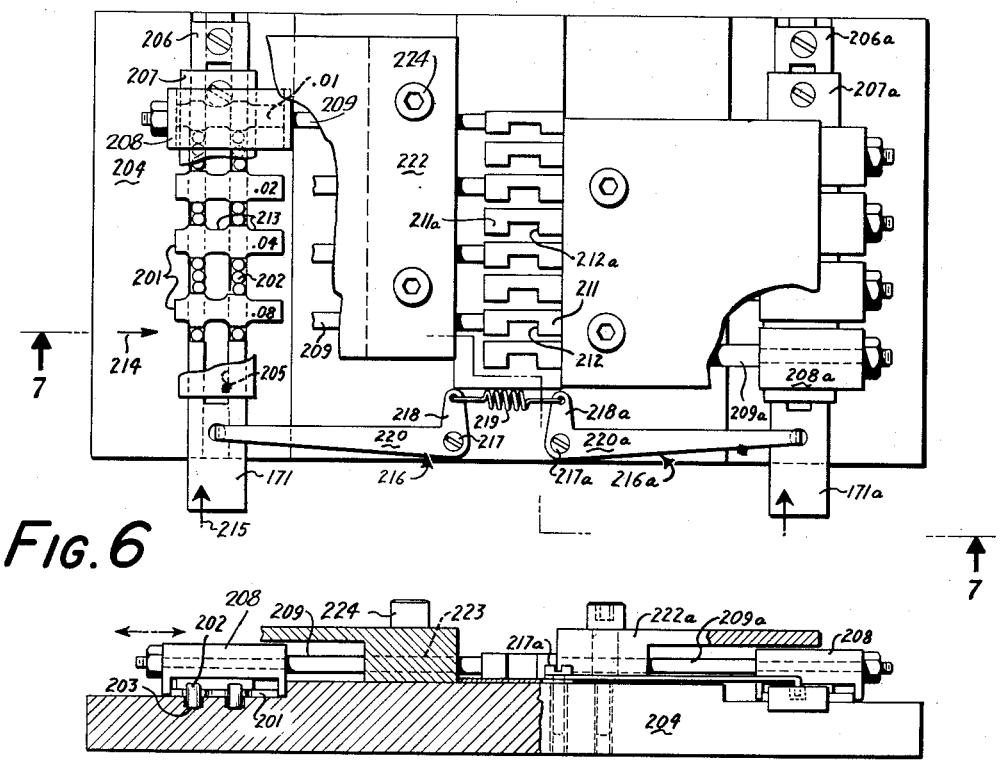
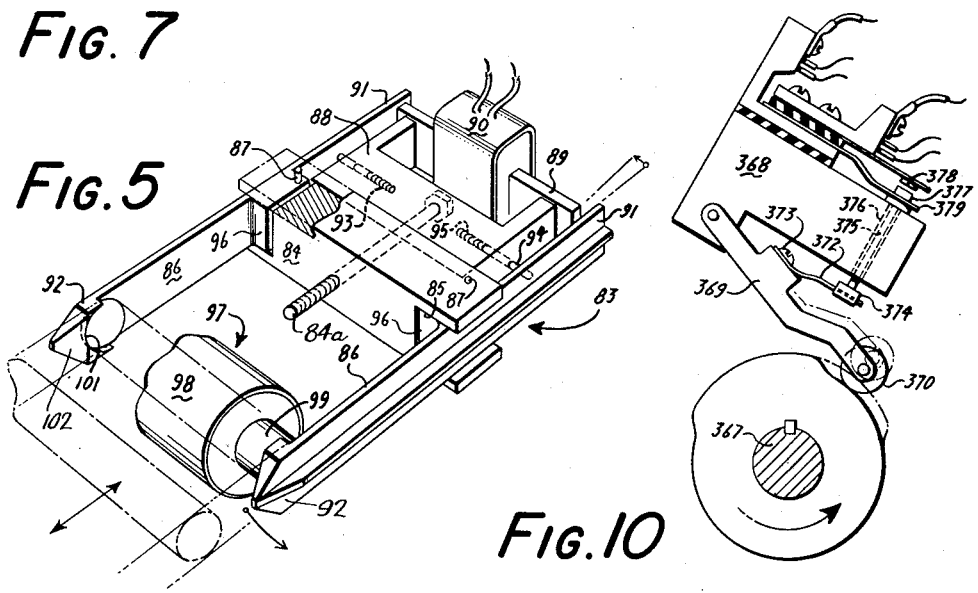

Oct. 21, 1958     R. B. JOHNSON ET AL     2,857,032
DATA RECORDING MACHINE
Filed May 4, 1954                                       17 Sheets-Sheet 7
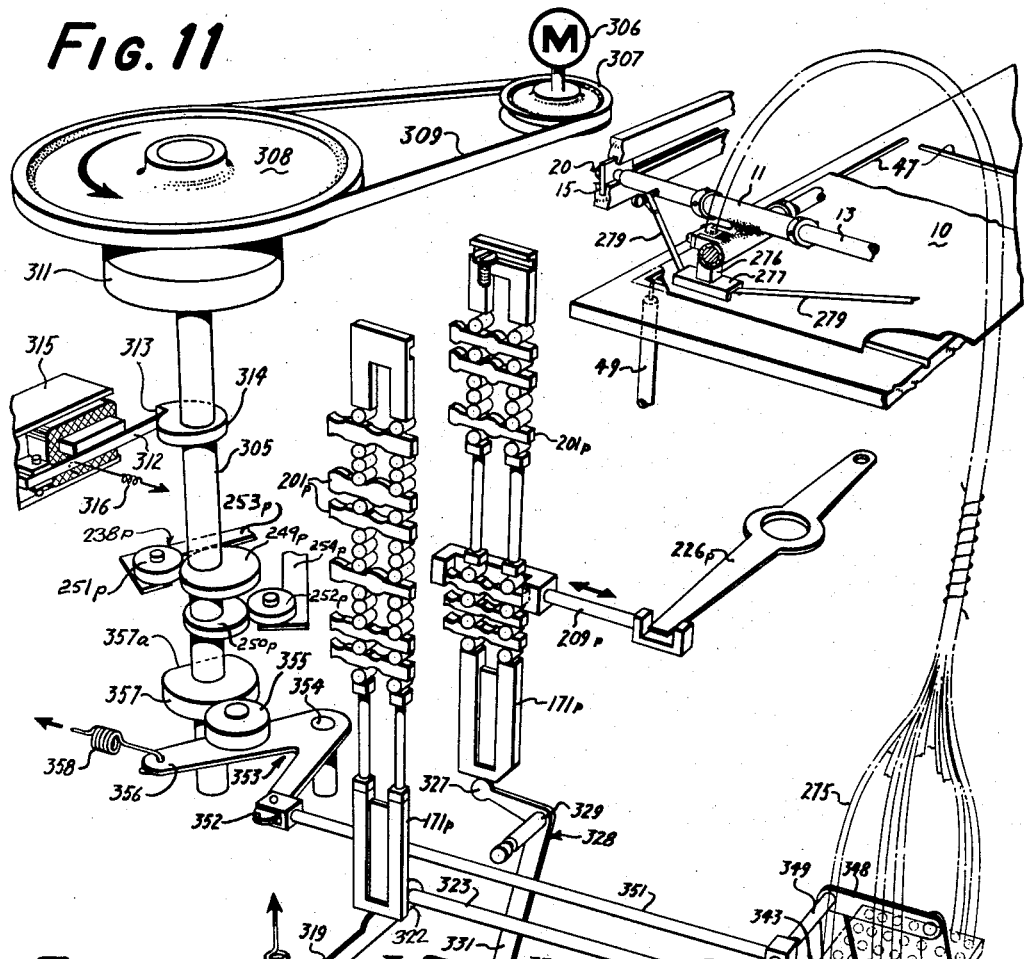
FIG. 11
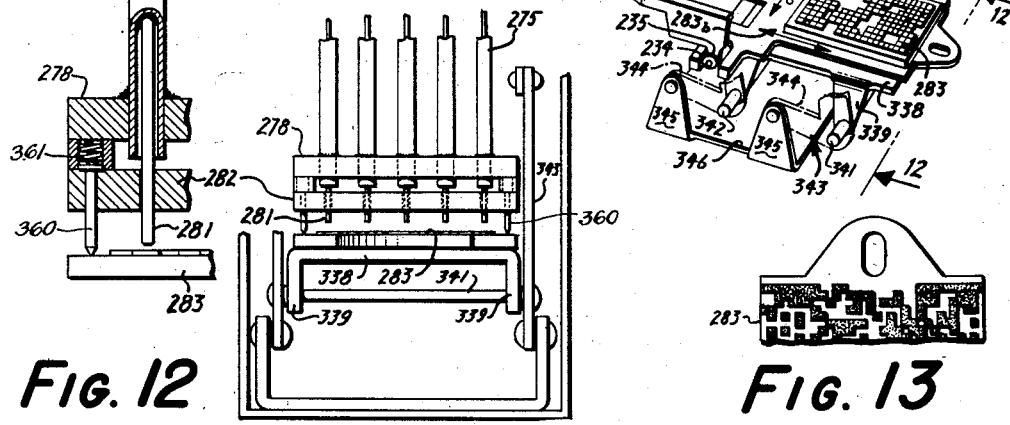
FIG. 12a
FIG. 12
FIG. 13

Oct. 21, 1958

R. B. JOHNSON ET AL 2,857,032

DATA RECORDING MACHINE

Filed May 4, 1954

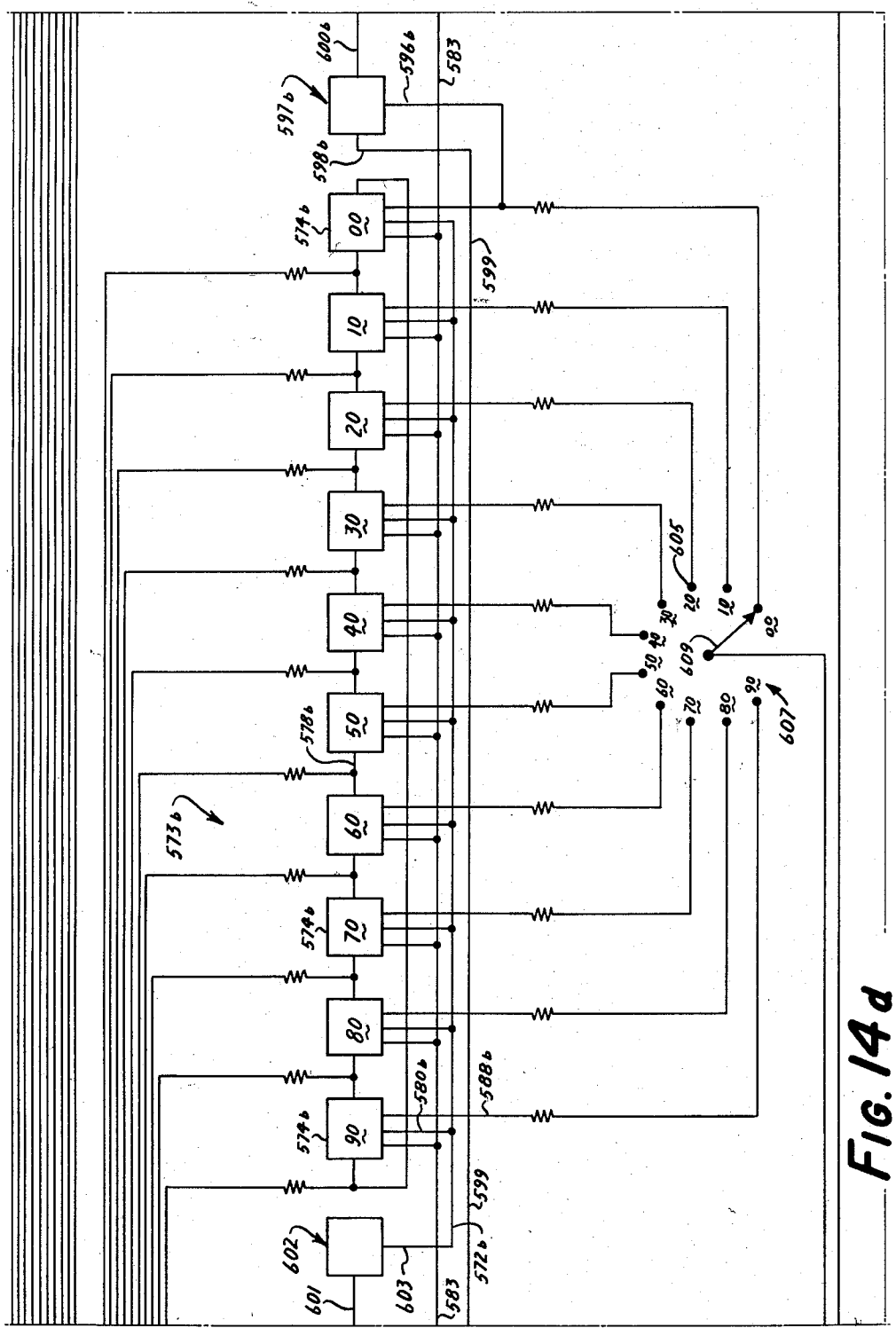

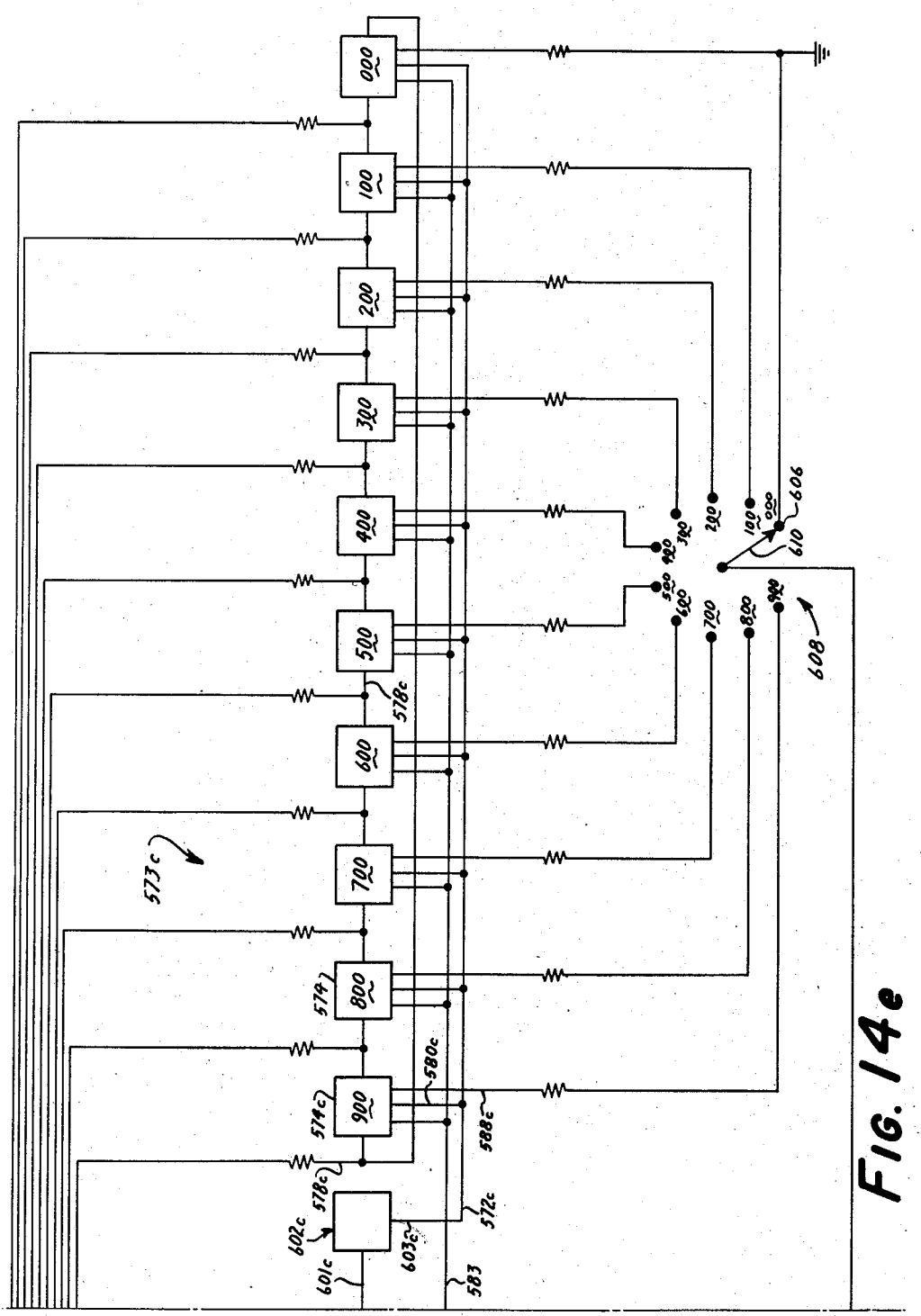

Oct. 21, 1958    R. B. JOHNSON ET AL    2,857,032
DATA RECORDING MACHINE

Filed May 4, 1954    17 Sheets-Sheet 14

Oct. 21, 1958     R. B. JOHNSON ET AL     2,857,032
DATA RECORDING MACHINE
Filed May 4, 1954                    17 Sheets-Sheet 16

United States Patent Office 2,857,032
Patented Oct. 21, 1958

2,857,032

DATA RECORDING MACHINE

Reynold B. Johnson, Palo Alto, John M. Harker and David W. Kean, Santa Clara County, and John J. Lynott, Los Gatos, Calif., assignors to International Business Machines Corporation, New York, N. Y., a corporation of New York Application May 4, 1954, Serial No. 427,418

11 Claims. (Cl. 197—1)

The present invention appertains generally to data recording machines. More particularly, it relates to machines for printing data at selectively assigned locations.

The machine of the invention includes a movable print head which may be programmed to print selected characters at desired locations on a record, the disposition of the print head relative to the record being controlled by the programmed information, as is the selection of a character to be printed at the programmed address.

It is one object of this invention, therefore, to provide a data recording machine having an addressable recording head.

Another object is to provide a machine adapted to print information at selectively assigned locations.

A further object is to provide a new and improved means for selectively positioning a data recording head relative to a recording surface.

Still another object is to provide an improved machine of the type described adapted to convert data into graphic form.

A still further object is to provide an asynchronous data recording machine having an addressable recording head wherein the speed of operation of the machine is independent of the distance between the physical locations of successive recordings.

Other objects of the invention will be pointed out in the following description and claims and illustrated in the accompanying drawings, which disclose, by way of example, the principle of the invention and the best mode which has been contemplated of applying that principle.

In the drawings:

Fig. 3 is a partial, expanded, perspective view of the intermediate and coarse drive assemblies.

Fig. 4 is a side elevation of the intermediate and coarse drive structure shown in Fig. 3.

Fig. 5 is a perspective view of one of the several roller support assemblies.

Fig. 6 is a view of the fine drive interposer assembly, taken along line 6—6 of Fig. 9, certain portions thereof being omitted or broken away.

Fig. 7 is a partial section taken along line 7—7 of Fig. 6.

Fig. 10 is a side view of one of the several cam operated circuit breakers utilized herein.

Fig. 11 is a diagrammatic, perspective view of the printing mechanism of the invention.

Fig. 12 is a partial, elevational view taken along line 12—12 of Fig. 11.

Fig. 12a is an enlarged view of part of the structure shown in Fig. 12, certain portions being broken away.

Fig. 13 is a plan view of a portion of the code plate associated with the printing mechanism of the invention.

Figures 14, 14A:
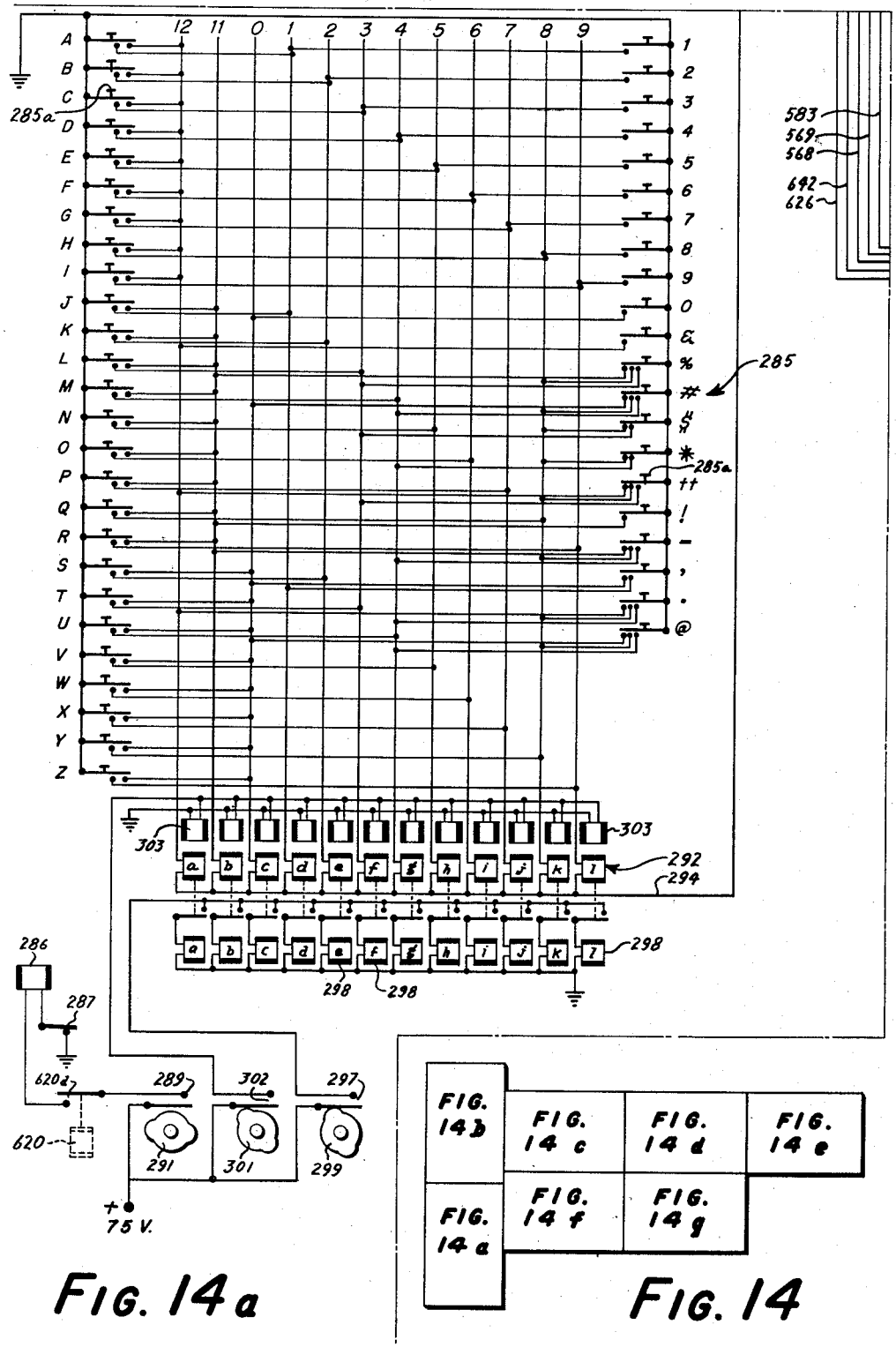
Figure 14B:
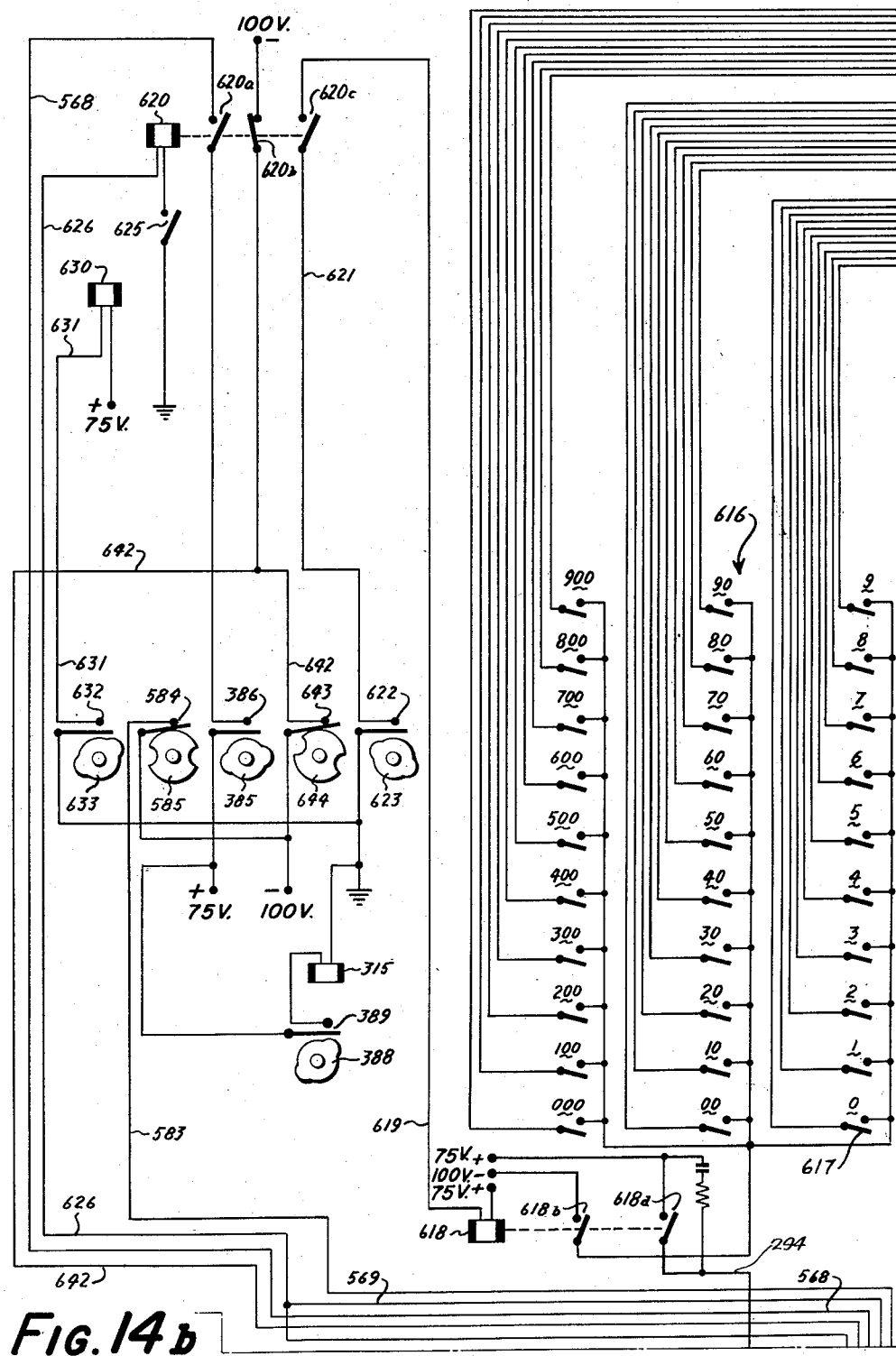

Figs. 14a through 14g comprise a schematic circuit diagram, partially in block form, of the invention and are to be arranged as indicated in Fig. 14.

Figs. 15 through 21 comprise detail circuit diagrams of certain portions shown in block form in Figs. 14a to 14g inclusive.

Figure 22:
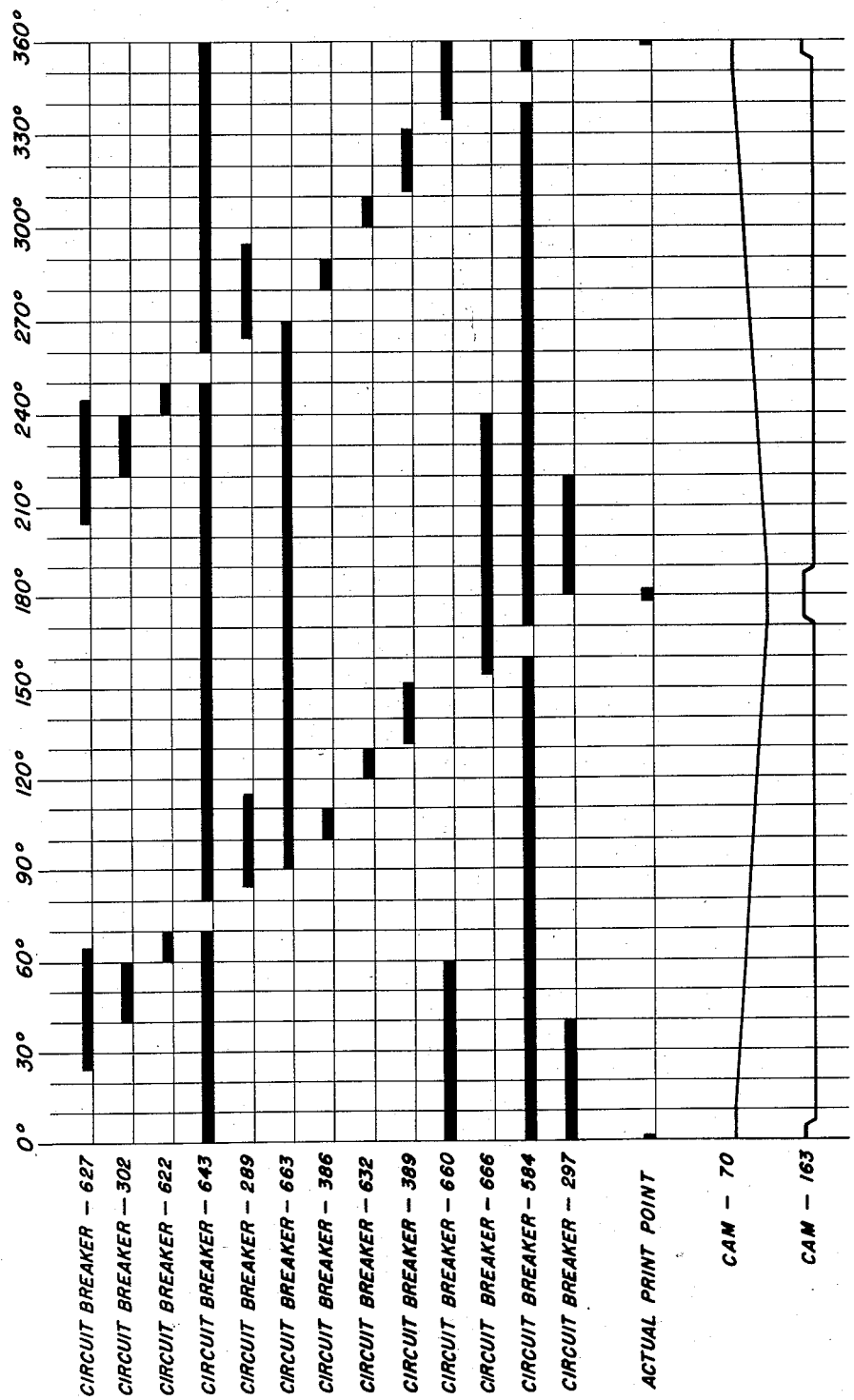

Fig. 22 is a timing diagram of the machine of the invention.

Fig. 23 is a diagrammatic illustration of an automatic programming device which may be utilized with the machine of the invention.

The machine of the invention comprises a positioning mechanism A (Fig. 1) which includes a recording table 10 and a movable print head 11, a drive mechanism B for selectively positioning the print head relative to the table, a programmable conversion unit C for controlling the selection of the character to be printed and also for regulating the drive mechanism to position the head according to the address of the character to be printed, and a printer D associated with the head 11 and controlled by the programmed conversion unit C to print a selected character at the programmed address.

*Positioning mechanism*

The recording table 10 is supported by a rigid frame 12, and the head 11 is movably supported above the table for controlled movement in a plane substantially parallel thereto by two mutually perpendicular, horizontally arranged cross rods 13 and 14. The head 11, provided with suitable bearings therewithin, is slidably mounted upon each of the rods 13 and 14, and secured to each end of each rod is a block 15 which is arranged to slide in a way 16 provided in each of four rectangularly aligned guide members 17. The print head 11 is selectively positioned by the controlled transverse movement of each of the rods 13 and 14, in the directions indicated by arrows 18 and 19, respectively, the head 11 being adapted to follow the point of intersection of the two rods.

Figures 1, 2:
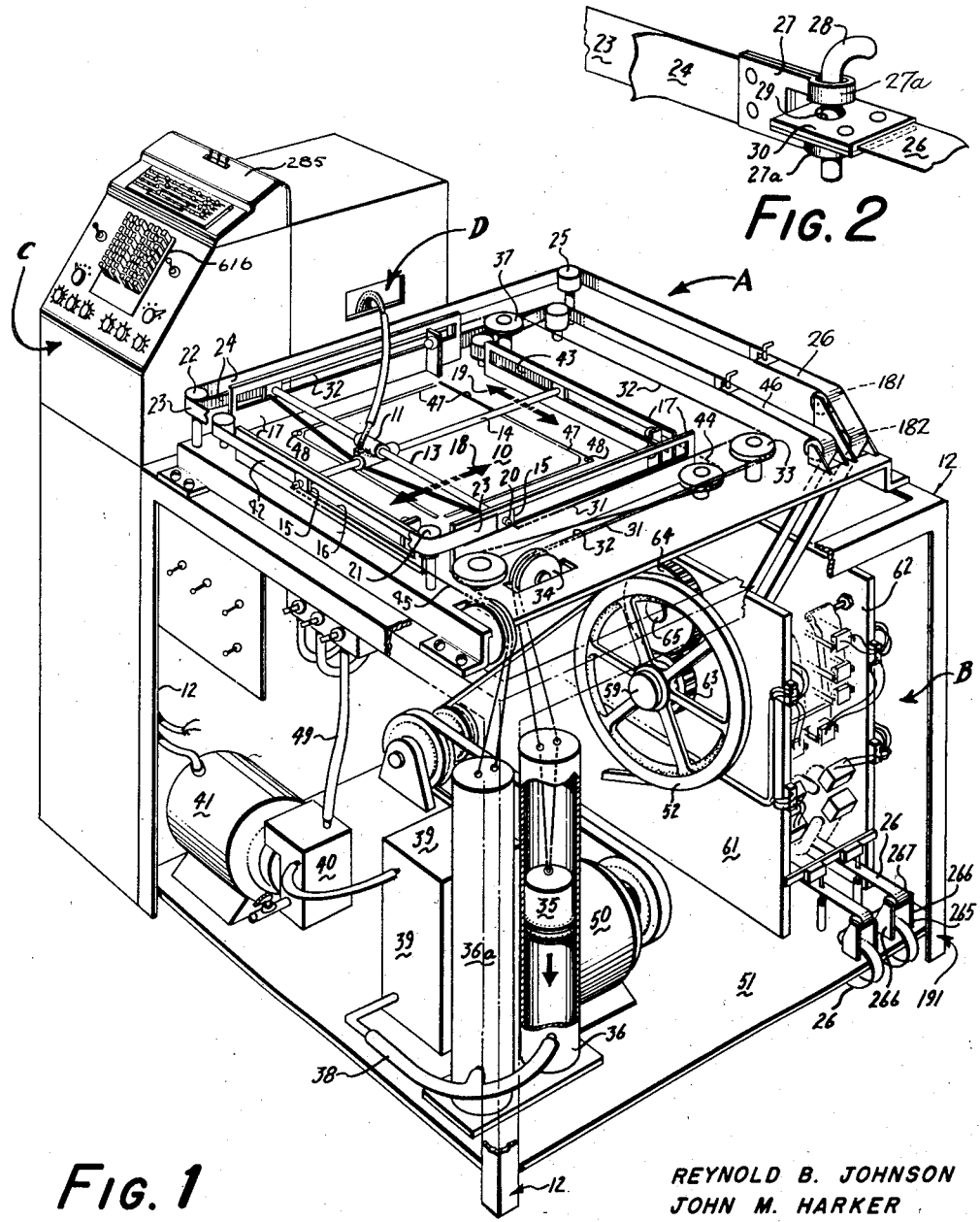
Fig. 1 is a perspective view of the machine of the invention.
Fig. 2 is an enlarged view of the tape connector assembly shown in Fig. 1.
Figures 1A, 9:
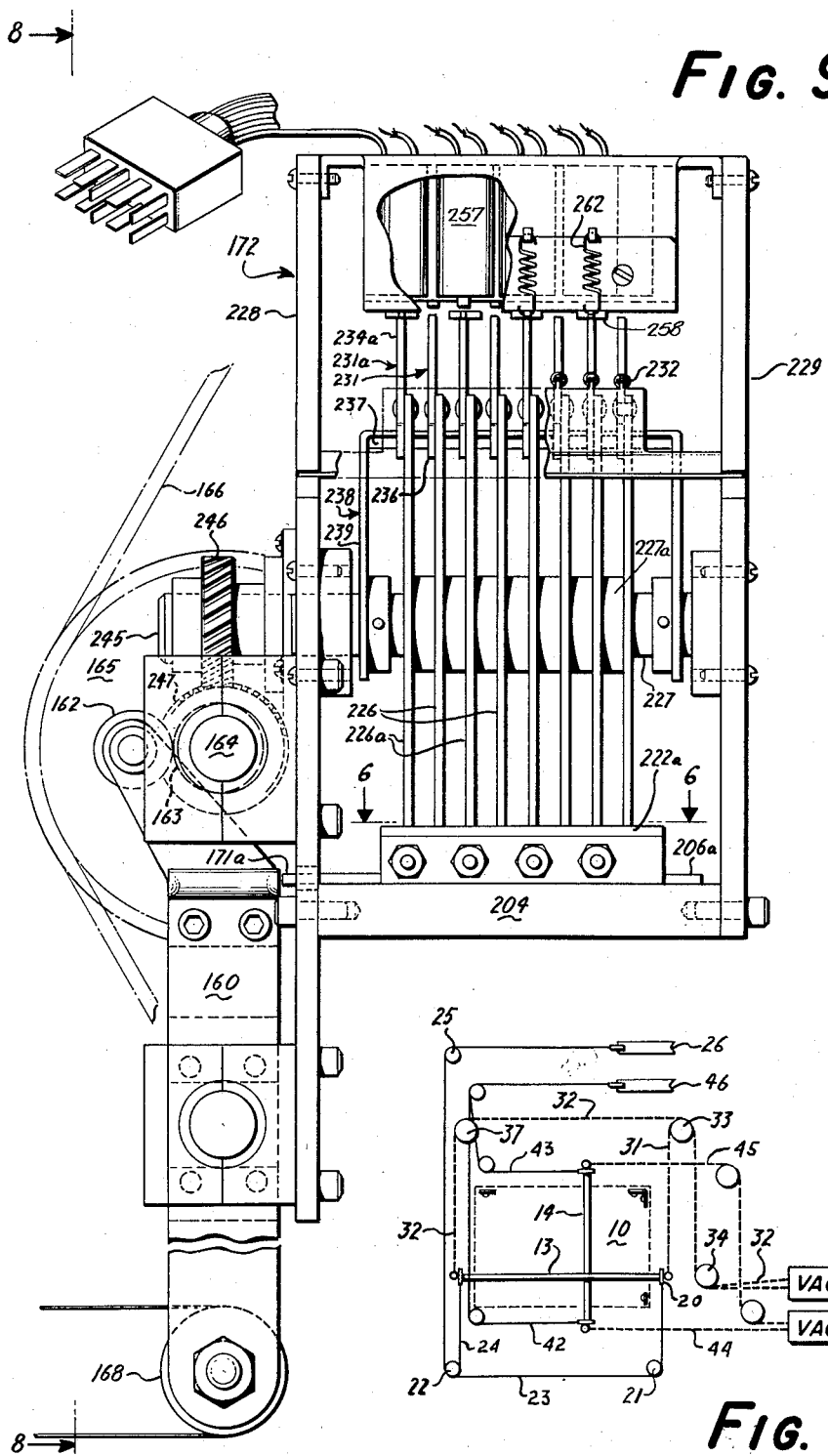
Fig. 1a is a diagrammatic view of a portion of the recording table.
Fig. 9 is a front elevation of the fine drive mechanism.

Secured to one end 20 (Figs. 1 and 1a) of the rod 13, exteriorly of the block 15, and extending around two fixed guide rollers 21 and 22 affixed to the table 10, is a thin steel tape 23. Another similar tape 24, connected to the other end of the rod 13, is also trained about the roller 22. The tapes 23 and 24 extend from the roller 22 around a fixed roller 25 and are connected to a tape 26 which controls the transverse movement of the rod 13 and thus controls the movement of the head 11 in the directions indicated by the arrow 18. Referring to Fig. 2, the tapes 23 and 24 are riveted to a yoke bracket 27, the arms 27a of which are arranged to receive a pin 28 which extends downwardly therethrough and through an aperture 29 provided in a connector 30 disposed intermediately of the arms 27a and secured to the tape 26.

Also secured to the ends of the cross rod 13 (Figs. 1 and 1a) are two steel cables 31 and 32. The cable 31 extends from the end 20 of the rod 13, around a pulley 33, downwardly over a pulley 34 and is connected to a piston 35 disposed within a cylinder 36. The cable 32 extends from the other end of the rod 13 around a pulley 37, around the pulley 33, and downwardly over the pulley 34 to the piston 35. The cylinder 36 is connected through a tubing 38 to a tank 39 which is maintained in vacuum by a pump 40 driven by a motor 41. The upper surface of the piston 35 is subjected to atmospheric pressure, and the piston 35 is, therefore, biased downwardly, due to the existing pressure differential. One end of the tape 26 is positively secured to the frame 12 by a mechanism 191, to be described, the other end being yieldably urged away therefrom by the piston 35. The drive mechanism B is provided to displace the tape 26, intermediately of the rod 13 and the point at which the tape is attached to the frame, in binary increments, which, in the present embodiment, are .01, .02, .04, .08, .16, .32, .64, 1.28, 2.56 and 5.12 inches, to thereby change the effective length thereof. It will be noted that, in this way, the rod 13, and thus the print head, may be selectively positioned along the path indicated by the arrow 18, by controlling the displacement of the tape 26, the piston 35 and associated cables being adapted to permit tape displacement but to maintain the tape under tension at all times.

Each end of the rod 14 is similarly connected to two tapes 42 and 43 and to two cables 44 and 45. The tapes 42 and 43 are connected to a tape 46, and the cables 44 and 45 are connected to the piston (not shown) of another evacuated cylinder 36a. The positioning of the rod 14, and thus the location of the head 11 along the path indicated by the arrow 19, is obtained by longitudinal displacement of the tape 46, in a manner similar to that described above in connection with the tape 26.

In accordance with the present embodiment of the invention, the recording table 10 is provided with two rectangularly extending grooves 47, and an aperture 48 is disposed at the apex of each such groove. These apertures are connected by tubing 49 to the vacuum pump 40, and, when a piece of paper upon which data are to be recorded is placed upon the table 10 in such a way as to extend beyond the grooves 47, as shown in Fig. 11, the air within the grooves is evacuated and the paper is drawn to the table and secured in position.

As mentioned above, one end of each of the tapes 26 and 46 is effectively connected to the pistons 35, the other end of each of said tape being positively secured to the frame 12 of the machine, and, by changing the displacement of either or both of the tapes at points intermediately of their ends, the rods 13 and 14, and thus the head 11 carried thereby, may be positioned accordingly. It will thus be clear that the address of a character to be printed is in the form of coordinates, and the print head is positioned according to the programmed coordinates. Since the drive mechanisms which control the displacement of the tapes 26 and 46 are identical, only that mechanism which controls the displacement of the tape 26 will be described.

*Drive mechanism*

A motor 50 (Fig. 1), mounted on a base plate 51 secured to the frame 12, is provided to continuously drive a sheave 52 through a pulley and belt arrangement, substantially as shown in the drawing. The sheave 52 is keyed to a shaft 59 which is suitably journalled in and which extends through each of two parallel, vertically disposed support plates 61 and 62 which house and support the drive mechanism B. A gear 67 (Fig. 3), suitably secured to the shaft 59 exteriorly of the plate 62, is arranged to mesh with and drive a gear 68, the gear 68 being keyed to a shaft 69 which is journalled in and extends through suitable bearings provided therefor in the plate 62. Keyed to the shaft 69, interiorly of the plate 62, is a cam 70 having a configuration as is shown in Fig. 4.

The cam 70 is provided to control the pivotal disposition of two rocker arms 72 and 73 which are journalled on shafts 74 and 75, respectively, extending between and secured to each of the support plates 61 and 62. The arms 72 and 73 are provided with cam followers 76 and 77 which are arranged to ride on the surface provided by the cam 70. As noted above, the shaft 59 is continuously driven, thereby continuously rotating the cam 70, and the track provided by the cam is arranged to rock each of the arms 72 and 73 about the shafts 74 and 75 through an arc, as indicated in phantom lines (Fig. 4) in connection with the arm 73. The track provided by the surface of the cam 70 to the followers 76 and 77 is illustrated graphically in Fig. 22, and it will be noted that the arms 72 and 73 are rocked by the cam 70 from one extreme position to the other and back again during each revolution of the shaft 69, with the arm 72 being adapted to reach one extreme position at the same time the arm 73 reaches its other extreme position. It should also be noted that suitable dwells are provided on the cam 70 to permit the arms 72 and 73 to remain at each extreme position for about 20° of each revolution of the shaft 59, for a purpose to be explained later herein.

One end of an arm 79 (Fig. 4) is mounted on the shaft 74, the other end of said arm being supported by a shaft 80 which is connected to and supported between the support plates 61 and 62. Similarly, one end of a second arm 81 is mounted on the shaft 75, the other end thereof being mounted on a shaft 82 which is secured to and extends between the support plates 61 and 62. The arms 79 and 81 are provided to support several roller support assemblies 83, which, as will be explained, control the coarse displacement of the tape 26.

Each roller support assembly 83 (Fig. 5) comprises a block 84 provided at each end with a notch 85 adapted to receive therethrough a roller support arm 86. The various blocks 84 are provided with a threaded stud 84a which is adapted to extend through an appropriate aperture provided therefor in the associated arm 79 or 81 (Fig. 4) for securing them in position thereto. Each arm 86 (Fig. 5) is pivotally mounted within its corresponding notch 85 by a pin 87 which extends downwardly through an opening in the block 84 and through a suitable aperture provided therefor in the arm 86. A yoke-like bracket 88 of non-magnetic material, affixed to the block 84, is provided to support the core 89 of an electro-magnet 90, the core being secured to the rearwardly extending arms of the yoke in any convenient manner. As will soon become apparent, it is desired to resiliently bias the ends 92 of the arms 86 toward each other, and for this purpose two transversely extending holes 93 of limited depth are provided in the base of the yoke 88. A pin 94 is slidably mounted in each hole and is resiliently urged therefrom and against the portion 91 of the associated arm 86 by a compressed coil spring 95. The degree to which the springs may move the ends 92 of the arms 86 toward each other is limited by the depth of the notches 85, the arms being arranged to abut the edge 96 of the block 84 to prevent excessive movement thereof.

The arms 86 of each assembly 83 are arranged to support therebetween a tape displacement roller 97, each of which comprises a cylindrical tape supporting surface 98 which is suitably journalled on a shaft 99. The rollers 97 are normally positioned between the arms 86, with the ends of the shaft 99 bearing against curved lips 101 provided therefor near each end 92 of each arm 86. Energization of any one of the magnets 90, however, will spread the arms 86 sufficiently to permit the corresponding roller to escape. It should be noted that the ends 92 of the arms 86 are provided with a tapered cam surface 102 to permit insertion of a roller 97 between the arms 86 without energization of the corresponding magnet 90, the shaft 99 being adapted to cam the arms 86 apart until it drops behind the retaining lips 101.

Each of the rocker arms 72 and 73 (Figs. 3 and 4) is provided with suitable sets of parallel notches 103 arranged to receive tape displacement rollers 97 released by the energization of the corresponding magnets 90. When a roller 97 is released, the ends of the shaft 99 thereof are adapted to ride in the associated notches 103, the tension of the tape which extends therearound being sufficient to hold the rollers in position within the notches. Referring to Fig. 3, the rollers 97c and 97g are shown as having been released by the arms 86 and are riding in the appropriate notches 103.

Mounted near the lowermost end of each of the arms 72 and 73 (Fig. 4) are rollers 105 and 106, respectively, against which two arms 107 and 108 are arranged to ride. The arms 107 and 108 are pivotally mounted at one end on studs 109 and 110, respectively, which studs are secured to the support plate 62, as best seen in Fig. 3. The arms 107 and 108 are resiliently urged together by a tension spring 112, and it will be understood that, as the arms 72 and 73 are rocked by the cam 70, the arms 107 and 108 are similarly rocked in a complementary direction.

Mounted on a shaft 113 (Fig. 3) which is journalled in and extends between the support plates 61 and 62 is a roller support member 114 comprising two spaced arms 114a rigidly secured together by the shaft 113 and by two shafts 116 and 117. The shaft 116 extends through the outermost arm 114a and supports thereon a cam follower 118 arranged to ride on the upper edge of the arm 107, substantially as shown. A tape displacement roller 119 is rotatably suported between the arms 114a on the shaft 117, and it should be noted that, as the arm 107 is rocked in a counter clockwise direction, the member 114 and roller 119 will similarly be rocked in a clockwise direction about the shaft 113. The upper end of the outermost arm 114a is provided with a latch edge 121 (Fig. 4) which is adapted to engage and latch behind a complementary edge 122 provided on an armature 123 of an electromagnet 124 arranged to operate the armature 123. When so latched, the member 114 is prevented from rotating in a counterclockwise direction, and the follower 118 is thereby maintained out of engagement with the edge of the arm 107.

The armature 123 is pivotally connected at 125 (Fig. 4) to the frame of the magnet 124, said frame being suitably supported by the support plate 62, and it is resiliently urged in a counterclockwise direction, as viewed in Fig. 4, and against a stop 125a by a tension spring 126. As shown in the drawing, the complementary edges 121 and 122 are in latching engagement with each other and thereby prevent the member 114 from following, through the follower 118, the movement of the arm 107. When the magnet 124 is energized, however, the armature 123 is raised out of engagement with the member 114 and it is permitted to follow the arm 107.

Three additional roller support members 131, 132 and 133 are pivotally mounted, in a manner similar to the member 114, on shafts 134, 145 and 146, respectively, and these members are arranged to support tape displacement rollers 137, 138 and 139. Normally, the members 131, 132 and 133 are latched in the position shown in Fig. 4; however, upon energization of their corresponding magnets 140, 141 and 142, the members are free to pivot and follow the associated arms 107 or 108, as was described in connection with the member 114. It should be noted in connection with the members 132 and 133 that they, unlike the members 114 and 131, are supported on the shafts 145 and 146 at points intermediately of their ends, the tape displacement rollers 138 and 139 associated therewith being mounted on the lower end thereof. In addition to the rollers 138 and 139, two fixed guide rollers 143 and 144 are mounted on shafts 145 and 146 associated with the members 132 and 133. The roller support members 114, 131, 132 and 133, along with the associated rollers and magnets, comprise the intermediate drive mechanism for controlling the "intermediate" displacement of the tape 26.

The "fine" drive mechanism includes a roller support member 160 comprising spaced, rigidly united arms 160a pivotally mounted on a shaft 161 (Fig. 3) supported by the support plates 61 and 62, and the uppermost portion of one of the arms 160a is provided with a cam follower 162 which is arranged to engage and follow the surface provided by a cam 163 secured to a shaft 164. The shaft 164 is journalled in and extends through support plates 61 and 62, and keyed to this shaft, exteriorly of the plate 62, is a sprocket 165. Sprocket 165, and thus the shaft 164 and cam 163, is continuously driven through a chain 166 trained about the sprocket 165 and also about another sprocket 167 secured to the aforementioned drive shaft 59 exteriorly of the gear 67. Supported by the lowermost portion of the member 160, between the arms 160a thereof, is a tape displacement roller 168. As best seen in Fig. 4, the member 160 is arranged to be swung about the shaft 161 by the cam 163 through the arc indicated in phantom lines. A rod 171, however, extending from a housing 172, is provided to control the degree to which the member 160 may swing in a counterclockwise direction, and the disposition of the rod 171 is controlled by a fine drive control mechanism which is located within the housing 172.

The fine drive control mechanism (Figs. 6 and 7) comprises an interposer arrangement wherein several interposers 201 are provided which may be selectively adjusted to control the longitudinal displacement of the rod 171. The mechanism for controlling the fine adjustment for each of the tapes 26 and 46 is shown in the drawings and, since they are identical, like parts will be identified by similar reference numerals, the suffix "a" being added to parts associated with the drive of the tape 46. A plurality of minute, vertically disposed cylinders 202 are provided between the several interposes 201 and are arranged to slide in two parallel grooves 203 (Fig. 7) which are machined in a plate 204. The innermost end of the rod 171 is notched at 205 to ride in the grooves 203. A stop 206, secured to the plate 204, is provided to limit the movement of the cylinders 202 and the interposers 201 theretoward, and a cover plate 207 is arranger to cover the various interposers and cylinders to prohibit their displacement vertically, as viewed in Fig. 7.

Extending over each end of each interposer 201 is an interposer control flange 208 which is secured to a rod 209 extending to a point centrally of the plate 204, and the innermost end of each rod 209 is attached to a member 211 having a notch 212. The interposers 201 are provided with a reduced cross-section at 213, each of them being reduced by a different, predetermined amount, and, when one of the rods 209 is moved in the direction of an arrow 214 (Fig. 6), it will be seen that the associated interposer 201 will be moved by the corresponding flange 208 into a position wherein the rod 171 may be advanced in the direction of an arrow 215, due to the reduced spacing between the cylinders 202 adjacent the actuated interposer 201. A bracket 222 is provided to guide the movement of the rods 209, each rod 209 being arranged to extend through a suitable aperture 223 provided therefor in the bracket, and the bracket is secured in position to the plate 204 by bolts 224. In addition to guiding the rods 209, the bracket extends over the interposer assembly and furnishes a protective covering therefor. Two bell cranks 216 and 216a, which are pivotally mounted on the plate 204 at 217 and 217a, respectively, are provided to resiliently urge the rods 171 and 171a inwardly in the direction of the arrow 215, the arms 218 and 218a of the bell cranks 216 and 216a being urged together by a coil spring 219. The arms 220 and 220a of cranks 216 and 216a are pivotally secured to the rods 171 and 171a, respectively, and it should be clear that, by the controlled actuation of the interposer control rods 209, the longitudinal displacement of the fine drive control rods 171 and 171a may be selectively controlled.

Eight fingers 226 (Fig. 9) are pivotally supported intermediately of their ends on a shaft 227 which extends between and is secured to members 228 and 229 which form a portion of the housing 172. Separators 227a are also mounted on the shaft 227 to space the fingers 226 apart. The lower end of each of the fingers 226 is arranged to ride in the notched portion 212 (Fig. 8) of one of the members 211 secured to the rods 209, and, if one of the fingers 226 is rocked in the proper direction about the shaft 227, the corresponding interposer will be displaced. Pivotally mounted on the upper end of each finger 226 is a bell crank 231 which is urged in a clockwise direction, as viewed in Fig. 8, by a spring 232 connected between the upwardly extending arm 234 of the crank 231 and an arm 235 secured to the housing 172. The other end 236 of the crank 231 extends under a horizontal portion 237 of a U-shaped bracket 238, the vertically disposed ends 239 of which are suitably journalled on the shaft 227. When the upwardly extending arm 234 of the crank 231 is free to move, the other arm 236 thereof is rocked in a clockwise direction about its pivot and into engagement with the horizontally extending portion 237 of the bracket 238, due to the pull of the associated spring 232, to the position indicated in phantom lines in Fig. 8. When, however, the upwardly extending portion 234 of the crank is secured in position, as shown in full lines in the drawing, the crank is not free to so move, and it is held out of engagement with the bracket 238.

A shaft 245 is journalled in and extends between the housing members 228 and 229. This shaft additionally extends exteriorly of the member 228, and keyed thereto is a gear 246 which meshes with and is driven by a gear 247 keyed to the shaft 164. It will be recalled that the shaft 164 is continuously driven through the chain 166, thereby continuously driving the shaft 245. Complementary cams 249 and 250 (Fig. 8) are secured to and driven by the shaft 245, and two followers 251 and 252 mounted on V arms 253 and 254, respectively, formed integrally with the U-shaped bracket 238, are adapted to follow the paths defined by said cams. These cams are arranged to continually rock the bracket 238, in the directions indicated by an arrow 256, about the shaft 227. If one of the bell cranks 231 is released and is swung by the spring 232 to the position indicated in phantom lines (Fig. 8), it will be clear that, when the bracket 238 is rocked forward, the end 236 of the crank 231 will be engaged by the bracket and the finger 226 associated with the released crank 231 will be rocked about the shaft 227, in a counterclockwise direction, thereby displacing the associated rod 209 and interposer 201.

Eight electromagnets 257 (Fig. 9), supported by the housing 172, are provided to selectively control the release of the bell cranks 231, to thereby control the disposition of the interposers 201. Associated with each of the interposer magnets 257 is an armature 258 (Fig. 8) which is pivoted to the frame 259 thereof and is urged downwardly away therefrom by a spring 262. Each of the armatures 258 (Fig. 8) is provided with a notch 259 in the lower face thereof, in which the arm 234 of the associated bell crank 231 is normally engaged. This notch prevents any clockwise movement of the crank 231. If, however, one of the interposer magnets is energized, thereby drawing the armature associated therewith upwardly, the arm 234 of the crank 231 is released and the crank is pivoted by the spring 232 in a clockwise direction until the arm 236 thereof engages the horizontally extending portion 237 of the U-shaped bracket 238.

Figure 8:
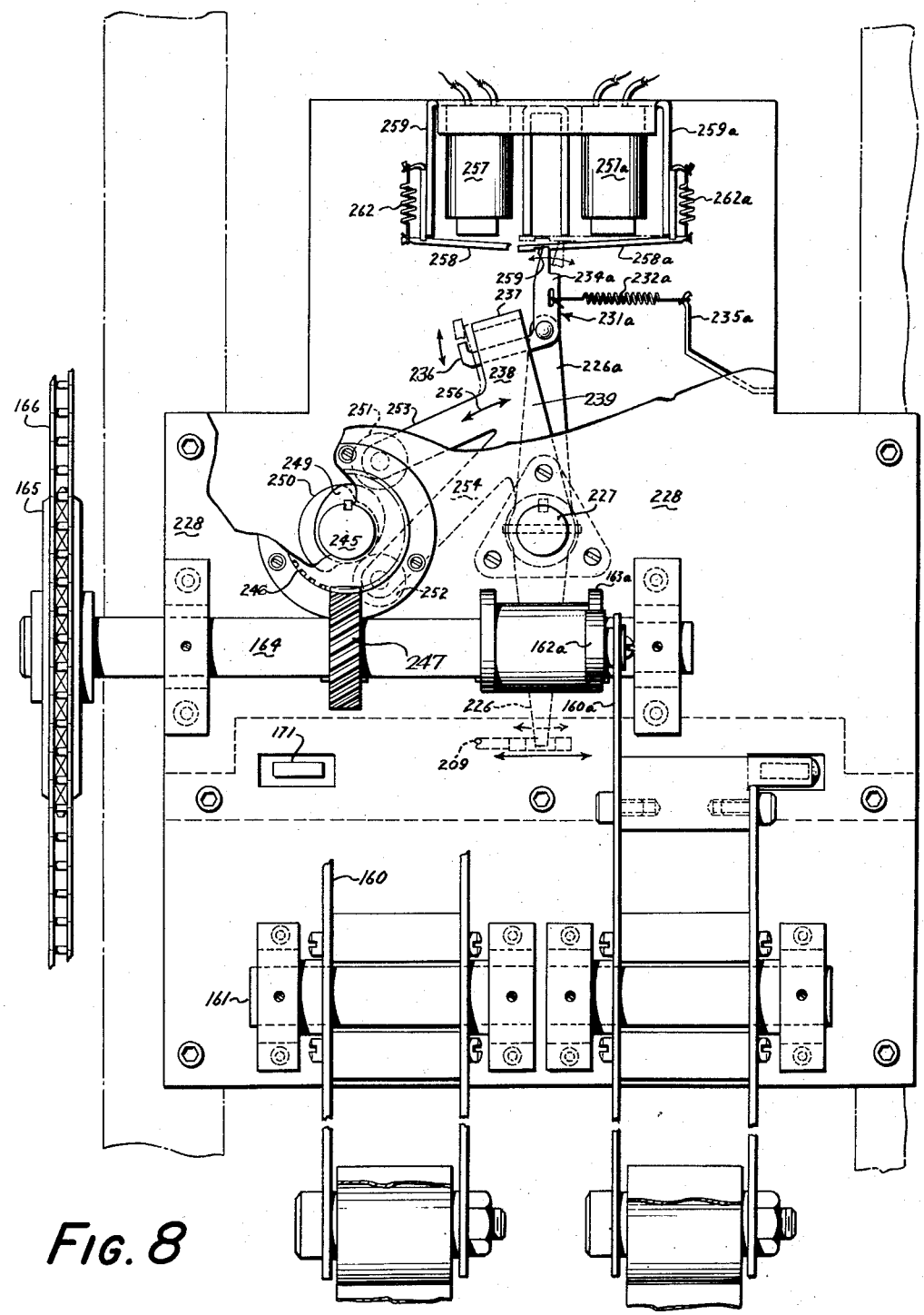
Fig. 8 is an elevation, with portions broken away, taken along line 8—8 of Fig. 9.

When the bracket 238 is rocked in a counterclockwise direction, as viewed in Fig. 8, by the action of the cams 249 and 250, the fingers 226 associated with energized interposer magnets 257 will be swung through the arms 236 of the cranks, in a counterclockwise direction by the U-shaped bracket 238. In addition, the arms 234 of these cranks will be moved to the left and back into the notches 259 to thereby reset them for the next cycle. Thus, it should now be clear that, when one of the interposer magnets 257 is energized, the corresponding finger 226 will be rocked in a counterclockwise direction, thus sliding the associated interposer 201 (Fig. 6) in the direction of arrow 214, thereby causing rod 171 to be displaced inwardly a predetermined amount in the direction of arrow 215. When the U-shaped bracket 238 is returned, by the action of cams 249 and 250, to the position shown in full lines in Fig. 8, the rearwardly extending edge of the horizontal portion 237 of the bracket 238 is arranged to engage and move the arms 234 of the cranks 231 to the right, to thereby reset the fingers 226 and interposers associated therewith in their normal position, since the arm 234 is at this time latched within the notches 259 provided in the armatures 258.

The tape 26 (Fig. 1) extends from the table 10 downwardly over two fixed guide rollers 181 and 182, around a fixed guide roller 183 (Fig. 4), about the displacement rollers 97a and 97b associated with the arms 81 and 79, about two guide rollers 184 and 185 secured to and carried by the arms 72 and 73, respectively, about the displacement rollers 97c and 97d, about displacement rollers 97e and 97f, about a fixed guide roller 186 supported on the shaft 75, about displacement rollers 97g and 97h, thence downwardly and about fixed guide rollers 187 and 188 supported by the support plate 62, about the displacement rollers 137, 119, 139 and 138, about the guide roller 144, about the displacement roller 168, and about guide rollers 143 and 267 to the point at which said tape is secured to the frame 12 by the aforementioned tape adjusting mechanism 191. It will be recalled that the tape 26 is maintained under tension by the vacuum cylinder 36 and that it is therefore continuously urged in the direction of an arrow 192 (Fig. 4).

The arms 79 and 81, which support the roller support assemblies 83, and the rocker arms 72 and 73 upon which the tape displacement rollers ride when released by their associated magnets, are so constructed and arranged that, when one of the rollers is released to ride in the notches 103 provided in one of the arms 72 or 73, the tape 26 will be advanced in the direction of the arrow 192 a predetermined, binary coded distance. In the present embodiment, the release of either of the rollers 97a or 97b will result in the tape 26 being moved a distance of 5.12 inches in the direction of the arrow 192. If, however, both of the rollers 97a and and 97b are released to ride in their associated notches, the net tape displacement will still be equal to only 5.12 inches, since, as one of the rollers 97a or 97b reduces the amount of tape displacement, the other roller 97b or 97a is arranged to increase it. When the address of successive characters to be printed each calls for a tape displacement of 5.12 inches, therefore, the print head is not returned to zero between characters but is retained at or near the location of the preceding character. This action reduces the motion of the print head and permits faster and smoother operation of the machine. Similarly, the release of either of the rollers 97c or 97d, 97e or 97f, or 97g or 97h will permit the tape to be moved in the direction of the arrow 192 distances of 2.56, 1.28 and .64 inches, respectively, the release of both rollers of one set having the same effect as that described above in connection with rollers 97a and 97b. These various rollers 97 will be referred to as the "coarse" drive rollers, and the magnets associated therewith, the coarse drive magnets.

The members 114, 131, 132 and 133 which carry the displacement rollers 119, 137, 138 and 139, respectively, comprise the "intermediate" drive mechanism, and these arms are so designed that, if either of the magnets 124 or 140 is energized, thus releasing the members 114 or 131 to follow the arms 107 or 108 respectively, to an extreme position, the resultant effect on the tape 26 will be to advance it the distance of .32 inch in the direction of the arrow 192. Similarly, energization of the magnets 141 or 142 will cause the tape 26 to be advanced a distance of .16 inch. As above, energization of each of the magnets 124 and 140, or 141 and 142, will only yield a net displacement of the tape 26 of .32 or .16 inch, respectively.

The four interposers 201 (Fig. 6) on the left-hand side of the plate 204 are utilized to position the tape 26, the four interposers on the right-hand side (not shown) being utilized to position the tape 46. The interposers 201 are so designed that the individual displacement thereof will yield a displacement of the rod 171 sufficient to cause a net displacement in the tape 26 of .01, .02, .04 and .08 inch, respectively, as indicated on the interposers, in the direction of arrow 192 (Fig. 4). Similarly, the displacement of any combination of these interposers (Fig. 6) will yield a resulting displacement in the tape 26 equal to the sum of the individual displacements, e. g., displacement of the .01 and .04 interposers will yield a net displacement in the tape of .05 inch. Thus, by energizing the proper interposer magnets 257, the fine drive of the tape 26 may be accordingly controlled.

The tapes 26 and 46 are secured at one end to the frame 12 (Fig. 1) by the tape adjusting mechanism 191. The mechanism 191 comprises a U-shaped block 265 (Fig. 4), between the upwardly extending legs 266 of which is supported the roller 267. A pocket 268 (Fig. 4) is provided in the block 265 to slidably receive a tape positioning member 269. The member 269 is arranged to abut a screw 271 which extends through and is threadedly engaged by a wall 272 of the block 265, and it is guided for horizontal movement by two pins 273 secured to the block 265, which slidably extend into suitable holes provided therefor in the member 269. The tape 26 extends from the guide roller 143, around the roller 267, around the end of the member 269 and under the block 265, the block 265 being suitably secured to the support frame 12 of the machine, thereby securing the tape in position between the block and the frame. To adjust the tape 26, to thereby permit an initial adjustment of the print head 11 as may be desired, the screw 271 may be turned to thereby move the member 269 to effectively change the length of the tape 26.

Normally, the tape displacement rollers 97 (Fig. 4) are engaged by their associated arms 86 in the position shown; the arms 114, 131, 132 and 133 are engaged behind the lips 122 of the armatures 123 of their corresponding magnets; and each of the interposers 201 (Fig. 6) is disposed in the position shown in the drawings. When the various elements relating to both of the tapes 26 and 46 are in this condition, the rod 13 (Fig. 1) is in its left-most position; the rod 14 is in its uppermost position; and the print head 11 is the 0—0 position, since the tapes 26 and 46 are displaced a maximum amount. By selectively energizing suitable drive magnets, or combinations thereof, to thereby selectively reduce the amount of tape displacement, the print head 11 may be relocated to position it adjacent the point at which a character is to be printed.

*Printing mechanism*

When the print head is in a programmed position, adjacent a point at which a character is to be printed, means are provided to print the character, which means include a wire printer similar to the one disclosed in U. S. Letters Patent 2,524,127. Referring to Fig. 11, the wire printer comprises 35 flexible tubes 275 terminating at one end in a rectangular tube guide 276. The guide 276 is hollow to receive the tubes 275, and the tubes are arranged to extend therethrough, in a compact, juxtaposed 5 x 7 matrix, and through a suitable opening provided therefor in the upper surface of a channel member 277. The channel member 277 is secured to the guide 276 and is arranged to house an inked ribbon 279, disposed between the protruding ends of the tubes 275 and the recording table 10, the ends of the ribbon being releasably attached near each end of the cross rod 13. The tube guide 276 is anchored to the print head 11 and is carried thereby, and the other ends of each of tubes 275 are affixed to and extend through apertures provided therefor in a plate 278 (Figs. 12 and 12a).

Slidably housed within each of the tubes 275 is a print wire 281, the ends thereof, which extend through that portion of the tubes 275 (Fig. 11) disposed within the guide 276, extending a short distance therebeyond to a point adjacent the upper surface of the ribbon 279. The other ends of these print wires (Figs. 12 and 12a) slidably extend through the plate 278 and through apertures provided therefor in a guide plate 282 to a point immediately adjacent a code plate 283. As was taught in the aforementioned patent, the code plate is formed with a pattern of high and low portions and, depending upon the adjusted position of the code plate relative to the 5 x 7 matrix of print wires, certain raised portions of the plate are arranged to cooperate with wires adjacent thereto to push those wires toward the tube guide 276 and against the ribbon 279 and thereby cause the printing of the character associated with the adjusted position of the code plate.

The actual positioning of the code plate, and thus the choice of the character to be printed, is controlled by a keyboard 285, illustrated schematically in Fig. 14a. The board is provided with a plurality of keys 285a, the characters to which they correspond being indicated therebeside. When one of the keys of this board is depressed, the contacts closed thereby will remain closed until a keyboard restore magnet 286 is energized. One side of the magnet 286 is connected through a normally closed switch 287 to ground, the other side thereof being connected through the normally open contacts 620d of a relay 620 (Fig. 14b), and through the normally open contacts of a circuit breaker 289 to (+)75 volts. The contacts of the circuit breaker 289 are controlled by a cam 291 to close at a predetermined time in the machine cycle, to restore the keyboard, if the switch 287 and the relay controlled contacts 620d are both closed, as will be more fully explained later herein. It should be clear, however, that the keyboard will not be restored if the switch 287 is open.

Each character to be printed is converted by the keyboard, in a well known manner, into the Hollerith code, and depression of any key 285a will connect one side of the corresponding ones of the several latch type storage relays 292 to ground. The other sides of the relays 292 are connected through a line 294 and through the normally open contacts 618d of a relay 618 (Fig. 14b) to (+)75 volts. Energization of the relay 618 will, therefore, energize the relays 292 which correspond to a depressed key and will latch their associated contacts down, thus entering the character in the keyboard into the storage relays 292. A (+)75 volts is connected through the normally open contacts of a circuit breaker 297 to the common side of the contacts associated with the relays 292, the other sides thereof being connected to a corresponding print magnet 298. A character entered into the keyboard and stored in the relays 292 will remain there until a cam 299 causes the contacts of the circuit breaker 297 to close, at which time (+)75 volts is placed across the print magnets 298 corresponding to latched relays 292. It should also be noted that a cam 301 is provided to close the contacts of a circuit breaker 302 to place (+)75 volts across the latch windings 303 of the relays 292 to release them and thereby erase the information stored therein at a predetermined time in the machine cycle.

The aforementioned code plate is adjustably positioned by an interposer arrangement very similar to that shown in Figs. 6, 7, 8 and 9 in connection with the above described fine tape drive mechanism, and due to this similarity, it is deemed unnecessary to show much of the structure associated with the print interposers, and it has been omitted from the drawings. Where necessary, in connection with the description of the printing mechanism, the aforementioned fine drive drawings will be referred to. Similar parts will be referred to by similar reference numerals, the suffix "p" being used to indicate its association with the printer. In the case of the print mechanism, the print magnets 298 (Fig. 14a) are utilized to control the position of the print interposers 201p (Fig. 11) through rods 209p and fingers 226p in the same manner that the fine drive magnets 257 control the disposition of the interposers 201 associated with the fine drive mechanism. Fingers 226p (Fig. 11) associated with energized print magnets 298 (Fig. 14a) are rocked by a U-shaped bracket 238p, a portion of which is shown in Fig. 11, similar to the bracket 238 (Figs. 8 and 9), which bracket is pivotally mounted and controlled for rocking motion by cams 249p and 250p (Fig. 11) which correspond to the complementary cams 249 and 250 (Fig. 8). These cams are keyed to a shaft 305 (Fig. 11) which is journalled in suitable bearings (not shown) and which is driven by a motor 306 through pulleys 307 and 308 and a belt 309.

When in operation, the pulley 308 is constantly driven by the motor 306; however, a one-revolution clutch mechanism 311 provided between the pulley 308 and the shaft 305 permits the shaft normally to be maintained stationary due to the normal position of a pawl-like armature 312 which engages a detent 313 provided in a ratchet member 314 secured to the shaft 305. The clutch 311 may be of any convenient or known design, so long as it is able to drive the shaft upon displacement of the armature 312, due to energization of a magnet 315 associated therewith. It will now be clear that the shaft 305 is normally stationary; however, upon energization of the magnet 315, it is free to complete one revolution, a spring 316 being provided to return the armature 312 to its locking position upon de-energization of the magnet.

During the first portion of each revolution of the shaft 305, interposers 201p associated with energized print magnets 298 are moved into actuated position to thereby displace rods 171p and 171p', in the manner described above in connection with the fine drive rods 171. The rod 171p is arranged to abut an arm 319 at a point intermediately of its ends, an end 320 thereof being biased upwardly in a clockwise direction by a spring 321. The other end 322 of the arm 319 is secured to a shaft 323, journalled for rotation about its longitudinal axis, the end 324 of which is securely fastened to a downwardly extending arm 325. The lower end of the arm 325 is positioned in a notch 326 provided in the end of the code plate 283, and it will be seen that, as the rod 171p is raised or lowered, by the displacement of interposers 201p, the code plate 283 will be moved in one of the two directions indicated by an arrow 283a.

The rod 171p' abuts one arm 327 of a bell crank 328, pivotally supported at 329, the other arm 331 of the crank 328 being pivotally connected to a yoke 332 at 333 and being biased in a clockwise direction by a spring 330. Each arm of the yoke 332 has a downwardly extending finger (not shown) formed integrally therewith, which supports a roller 334 arranged to ride in a notch 335 provided in each side of the code plate. When the rod 171p' is displaced upwardly or downwardly, by the displacement of the interposers 201p, the code plate 283 will be moved in either of the directions indicated by an arrow 283b. Thus, when certain of the print magnets are energized through the keyboard, etc., as explained above, certain of the interposers 201p are displaced, and the code plate 283 is moved to a predetermined position, to thereby place high portions thereof adjacent only certain of the print wires which form a character corresponding to the key actuated. All that remains to accomplish the actual printing is to drive the code plate against the wires, to thereby drive the wires which form the programmed character against the inked ribbon 279.

Referring to Fig. 11, the code plate 283 is supported on a bracket 338 provided with two pairs of legs 339 which extend downwardly near each corner thereof. Shafts 341 and 342 extend through and are secured to each of two of the legs 339 of each pair, and each end of each shaft is journalled in a suitable aperture provided therefor in one of four bell cranks 343. One arm 344 of each bell crank 343 is pivoted to a corresponding upwardly extending arm 345 of a bracket 346 which is fixed to the frame of the device, and the upwardly extending arms 347 of the cranks 343 are coupled together for conjoint movement by links 348 (only one being shown) and a rod 349. The rod 349 is secured to one end of a push rod 351, the other end of which is pivotally connected to an arm 352 of a crank 353. The crank 353 is supported for pivotal movement about a fixed shaft 354, and a cam follower 355 secured to an arm 356 of the crank is urged aagainst the track provided by a cam 357 by a spring 358. The cam is keyed to the shaft 305, and near the end of each revolution thereof a dwell 357a on the cam is presented to the follower 355, which dwell is arranged to suddenly permit the spring 358 to rock the crank 353 a short distance in a clockwise direction. At this time, the cranks 343 are caused to rock in a counterclockwise direction, thereby raising the bracket 338 and code plate 283 and causing the high portions of the code plate to strike adjacent print wires, thereby driving them against the ribbon 279 and printing the programmed character. The code plate is normally maintained away from the guide plate 282 (Fig. 12a) by several pins 360, the pins being biased toward the plate by springs 361, and after printing is accomplished the code plate is repositioned away from the print wires by these pins.

*Conversion unit*

It will now be clear that the print head is positioned along each of the two coordinates of the record surface by the controlled displacement of the tapes 26 and 46. For convenience, these coordinates will be referred to as the X and Y coordinates, the Y coordinate being controlled by the tape 26.

The priminary function of the conversion unit C (Fig. 1) is to convert the programmed coordinate data into the binary code required by the drive mechanism B. Additional functions of the conversion unit are scale factoring and zero offset. Since the conversion circuits relating to each of the tapes 26 and 46 are identical, only that structure which controls the positioning of the tape 26 is shown and described. Generally, conversion of the Y coordinate is accomplished by gating a multivibrator 550 (Fig. 14f) to generate a number of pulses equal to the decimal coded value of the Y coordinate, and these pulses are then entered into a binary counter 551 (Fig. 14g) which in turn selectively controls the energization of the various aforementioned coarse, intermediate and fine drive magnets.

The multivibrator 550 (Fig. 14f) comprises vacuum tubes 552 and 553 and is normally inoperative or "off" due to the #3 grid of the tube 552 being biased below cutoff. However, when the potential of the #3 grid of the tube 552 is raised sufficiently, by circuitry to be described, the multivibrator will oscillate at a predetermined frequency which, in the present embodiment, is in the neighborhood of 30 kc. When the multivibrator is on, positive pulses generated thereby are taken from the plate of tube 553, which is coupled to the grid of a normally nonconducting amplifier tube 554, and are used to render the tube 554 conductive for the duration of each pulse. The resultant negative pulses taken from the plate of the tube 554 are then entered into the binary counter 551 (Fig. 14g) through a line 555 and through the desired contacts 556a through 556d of a scale factoring switch 556.

The multivibrator 550 is turned on when a line 557, connected to the #3 grid circuit of tube 552, is raised in potential sufficiently to render the bias on the #3 grid ineffective and thereby permit the tube 552 to conduct.

The potential of the line 557, and thus that of the #3 grid, is controlled by three trigger circuits 558, 559 and 560 which include vacuum tubes 561 to 566 inclusive. The trigger 558 utilizes tubes 561 and 562 and has two stable conditions, the normal condition being when tube 562 is cut off and tube 561 is conducting. When, however, a positive pulse is applied to the control grid of tube 562, through a line 568, the other condition of stability results and the plate of tube 562 drops in potential. As will be explained later herein, the trigger 558 is reset by the application of a positive pulse through a line 569 to the control grid of the tube 561.

The trigger 559, comprising tubes 563 and 564, also has two conditions, the normal condition being when tube 563 is conducting and tube 564 is cut off. When the plate of tube 562, associated with the trigger 558, drops in potential, as described above, the control grid of the tube 563 is driven negative and the trigger 559 switches to its other condition of stability, i. e., with tube 563 cut off and tube 564 conducting. It will be observed that the above mentioned line 557 is connected to the plate of the tube 563 and that each is normally at a low potential, since the tube 563 is normally conducting; however, when the trigger 559 reverses its condition of stability, the potential of the plate of the tube 563 goes up, thus raising the potential on the #3 grid of tube 552 and permitting the multivibrator to oscillate.

The trigger 560, a Schmitt trigger, includes tubes 565 and 566 and is provided to turn the multivibrator 550 off after the proper number of pulses has been generated thereby. Tube 565 is normally cut off and tube 566 is normally conducting; however, when a positive pulse is applied to the control grid of tube 565, through a line 571, the opposite condition results for the duration of the pulse. Application of a positive pulse to the grid of tube 565 causes that tube to conduct, thereby causing the plate thereof to drop in potential. The plate is coupled to the grid of tube 564; and, if the line 557 is high, due to the tube 563 being cut off, tube 564 is conducting, and the drop in plate potential of tube 565 drives the grid of tube 564 below cutoff and thereby reverses the condition of stability of the trigger 559, thus lowering the potential of the line 557 and turning the multivibrator off. As will be more fully explained hereinafter, the positive pulse which is applied to the grid of the tube 565 of the Schmitt trigger 560 is created when the multivibrator has generated a number of pulses equal to the decimal coded value of the programmed Y co-ordinate of the particular character to be printed. In this way, the multivibrator is controlled to enter into the binary counter 551 the correct number of pulses.

In addition to being entered into the binary counter 551, the negative pulses generated by the multivibrator 550 and taken from the plate of tube 554 are fed through a line 572 to each of the ten stages of the units order 573a (Fig. 14c) of a ring counter 573. The units order of the counter comprises ten trigger circuits 574, each of which is substantially identical and one of which is shown schematically in Fig. 15. Each trigger circuit 574 includes two tubes 575 and 576, and each has two conditions of stability, i. e., "off" when tube 575 is conducting and tube 576 is cut off, and "on" when tube 575 is cut off and tube 576 is conducting, which conditions it assumes alternately upon receipt of the proper voltage impulses. Normally, each trigger is off and is turned on by the application of a negative pulse to the grid of tube 575 through a line 578. A trigger 574 is turned off either by the application of a negative pulse to the grid of tube 576 or by removing the negative bias on the grid of tube 575. The grid of tube 576 is coupled through a condenser 579 to a line 580 which is connected directly to the line 572 (Figs. 14c and 14f) leading from the output of the multivibrator. The grid of tube 575 (Fig. 15) is connected through a resistor 581, a line 582, a line 583 (Figs. 14c, 14f, 14a and 14b), and a pair of normally closed contacts of a circuit breaker 584 to a (—)100 volts. The contacts of the circuit breaker 584 are controlled by a cam 585 to open at a predetermined time, to remove the bias from the tubes 575 and thereby reset the triggers 574.

The negative pulses generated by the multivibrator and fed through the line 572 to the lines 580 have no effect on the trigger circuits 574 unless they are on, since, when off, the tubes 576 are already cut off. If a trigger 574 is on, however, it will be turned off by such a pulse. When a trigger 574 is turned off in this manner, a negative pulse is created which may be taken from a line 587 coupled to the plate of tube 575, since, when turned off, the plate of tube 575 drops from a high to a low potential. Additionally, it should be noted that a line 588 is connected to the plate of tube 575 and that its potential is controlled thereby.

Figure 14C:
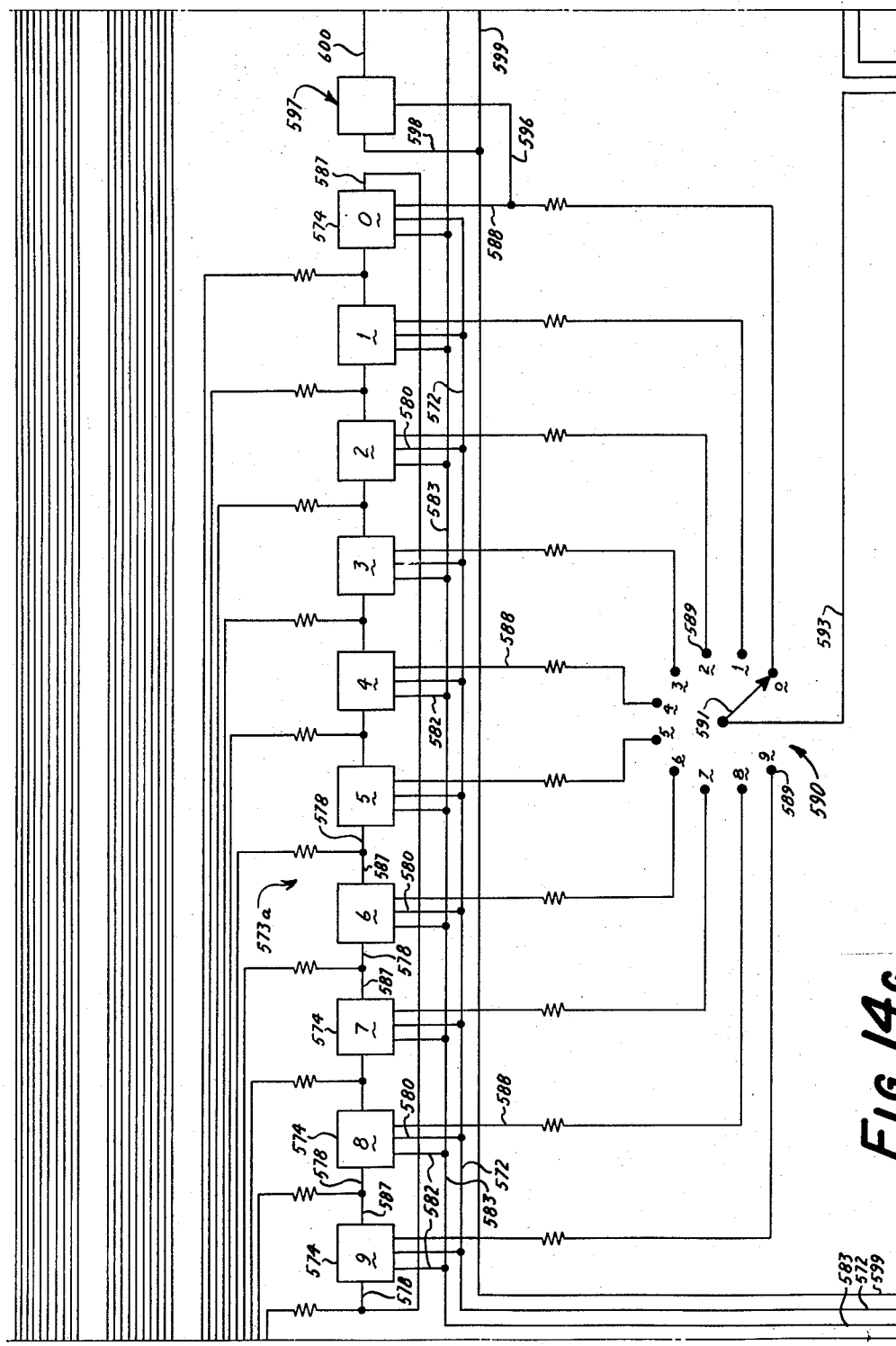
Figure 14F:
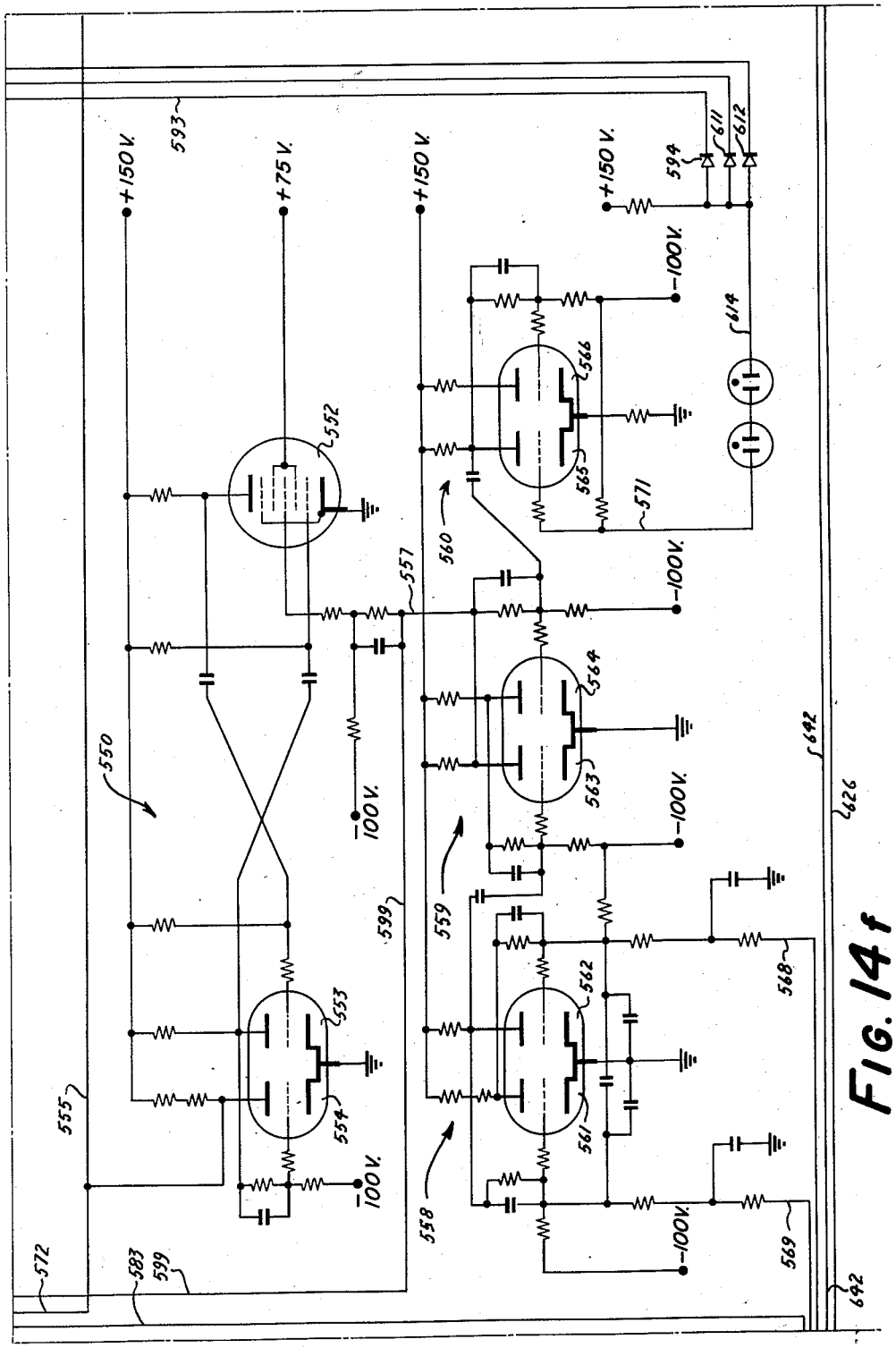

Referring now to Fig. 14c, ten triggers 574 are connected in a ring, with the output line 587 of each stage being connected to the input lines 578 of the next succeeding stage, the output line 587 of the last stage being connected to the input line 578 of the first stage. Each line 582 is connected to the reset line 583 and each line 580 is connected through the line 572 to the multivibrator output. The lines 588 are connected through suitable resistors to appropriate contacts 589 of a ten-position zero offset switch 590, and the armature 591 of the switch 590 is connected through a line 593 to the cathode of a diode 594 (Fig. 14f). If one of the triggers 574 is turned on, by lowering the potential of the line 578 associated therewith, and the multivibrator is turned on, it should be clear that the first pulse taken from the line 572 will turn the "on" stage off, and, due to the resulting drop in potential of line 587, and thus the line 578 connected thereto, the next succeeding stage 574 will be turned on. Similarly, the next multivibrator pulse will turn that "on" stage off, thereby turning the next succeeding stage "on." This procedure will continue, with the "on" stage advancing around the ring, until the multivibrator is turned off.

Figure 16:
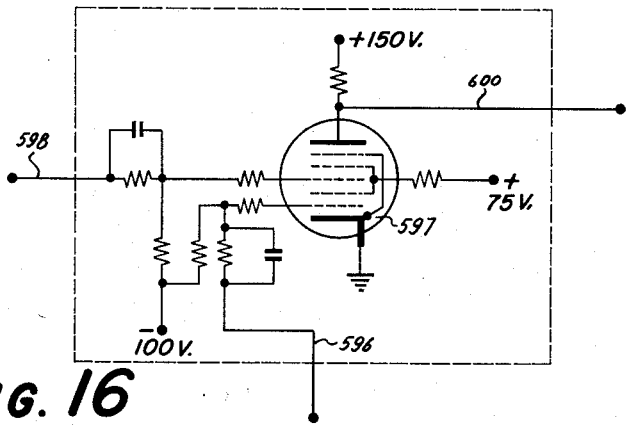
Figure 17:
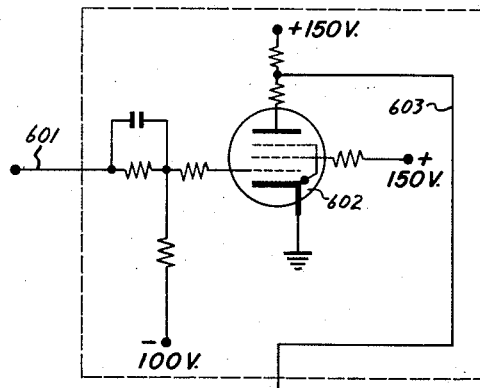

The line 588 (Fig. 14c) leading from the "0" stage of the counter 573 is connected, through a line 596, to the control grid of a switch tube 597 illustrated schematically in Fig. 16. Normally, the control grid and the #3 grid of tube 597 are biased below cutoff. The #3 grid is connected through lines 598 and 599 (Fig. 14c) to the line 557 (Fig. 14f). It will be recalled that when line 557 is high the multivibrator is on and, conversely, when it is low the multivibrator is off. Thus, when the multivibrator is on, the potential of the #3 grid of tube 597 is raised above cutoff, and application of a positive pulse to the control grid thereof will render it momentarily conductive. When the "0" stage of the counter 573 is turned on, the potential of line 588 leading therefrom goes from low to high and this positive shift will cause tube 597 to conduct if the multivibrator 550 is on. When tube 597 conducts, its plate, and thus a line 600 connected thereto, drops in potential. A line 601, connected to the control grid of a normally conducting amplifier 602 (Figs. 14d and 17), is connected directly to the line 600 and, when the plate of tube 597 drops, due to the "0" stage of the counter 573 being turned on, tube 602 is cut off and the plate thereof rises in potential. The next pulse generated by the multivibrator turns the "0" stage off and the "9" stage on, thereby lowering the potential of the line 588 extending from the "0" stage and again cutting off the switch tube 597. When cut off, the plate of the tube 597 rises and permits the amplifier tube 602 to again conduct, thereby lowering the potential of the plate thereof.

The plate of tube 602 is connected through a line 603 to a line 572b of the tens order 573b of the ring counter 573 (Fig. 14d), which order is substantially identical to the units order 573a described above. When the "0"

stage of the counter 573 is switched from on to off, the plate of tube 602 drops in potential. This drop places a negative pulse on the grid of the tube 576b of each trigger 574b of the tens counter through the lines 603, 572b and 580b. The negative pulses have the same effect on the tens order 573b as the multivibrator pulses have on the units order 573a, and successive negative pulses will advance the "on" trigger around the ring.

The hundreds order 573c (Fig. 14c) of the counter 573 is connected to and driven by the tens order 573b in the same manner that the tens order is driven by the units order, a negative pulse being applied to the line 572c each time the "00" trigger 574b is turned off. The lines 588b and 588c of the orders 573b and 573c are connected to the corresponding contacts 605 and 606 of two vero offset switches 607 and 608, respectively, and the armatures 609 and 610 of these switches are connected to the cathodes of diodes 611 and 612 (Fig. 14f), respectively. Like the units order 573a, the various stages 574b and 574c of the orders 573b and 573c are reset by the opening of the contacts of the circuit breaker 584 (Fig. 14b), which removes the bias supplied thereto through the line 583.

It will be recalled that all trigger stages 574 of the units order 573a are normally off, and this is also true for the triggers 574b and 574c of the tens and hundreds orders. Thus, for example, if the "5," the "50" and the "500" stages of the counters were turned on by the application of negative pulses through the lines 578, 578b and 578c, respectively, of these stages, it will not be until 555 pulses have been generated by the multivibrator that the "0," "00" and "000" stages of the counters will be on simultaneously. At this time, with the switches 590, 607 and 608 in the position shown, the cathodes of the three diodes 594, 611 and 612 (Fig. 14f) are all at a high potential, due to the lines 588, 588b and 588c each being high, and a line 614 connected to the anodes of the diodes will accordingly be high. It will be understood, however, that the line 614 will not be high until all three of the lines 588, 588b and 588c leading from the last stage of each order of the counter are high. When the line 614 is high, the potential thereof is sufficient to ignite two serially connected neon bulbs and to place a positive pulse on the line 571 connected to the grid of the tube 565 of the Schmitt trigger 560. It will be recalled that the tube 565 is normally nonconducting; however, it is rendered conductive by this pulse for the duration thereof. As soon as the tube 565 commences to conduct, the plate thereof drops in potential and, since the plate is coupled to the grid of tube 564, which tube is conducting while the multivibrator is on, the drop in potential of the plate of tube 565 will cause the trigger 559 to switch, thus lowering the potential of the line 557 and turning off the multivibrator. On the basis of the above example, it should thus be clear that, with the armatures of the zero offset switches 590, 607 and 608 in the position shown, i. e., in contact with the contacts 0, 00 and 000 thereof, the multivibrator will be turned off after it has generated a total of 555 pulses.

The switches 590, 607 and 608 have been referred to as zero offset switches, and when it is desired to offset the zero position of the print head 11 for some reason, such as when the machine of the invention is used as a plotter, as will be described, the switches 590, 607 and 608 may be adjusted accordingly. The number of pulses which are entered into the binary counter for a given character address is directly controlled by the position of the zero offset switches, the number of pulses being equal to the decimal coded input less the setting of the switches. For example, if the number 555 is entered into the machine and if the switches are set at 500, i. e., with switches 608, 607 and 590 set at 500, 00 and 0, respectively, only 55 pulses will be entered from the multivibrator into the counter before the multivibrator is turned off, since after 55 pulses the cathodes of all three diodes 594, 611 and 612 are high.

The Y coordinate data is entered into the machine by turning the corresponding stages of each of the three orders of the ring counter on. This may be accomplished by means of a keyboard 616 (Fig. 14b) having thirty keys 617 with the decimal values indicated in the drawing. One side of each order of keys 617 is common and is connected through a pair of normally open contacts 618b of a relay 618 to a (—) 100 volts. The other side of each key 617 is connected through an isolating resistor to the line 578 of the corresponding stage of the ring counter 573. It will be recalled that each stage of each ring counter is normally off, i. e., that the tube 575 thereof is conducting, and if one of the keys 617 is closed, the stage of the counter associated therewith will be turned on upon energization of the relay 618, since the resulting negative voltage applied to the grid circuit of the corresponding tube 575 will cut that tube off. The keyboard may be of any convenient design; however, with the present embodiment, it is desired to provide one in which the contacts thereof associated with depressed keys will remain closed until another key of the same order is depressed.

One side of the relay 618 is connected to a (+)75-volt supply, and the other side is connected through a line 619, through the normally open contacts 620c of a latch type relay 620, through a line 621 and through the normally open contacts of a circuit breaker 622 to ground. The disposition of the contacts of the circuit breaker 622 is controlled by a cam 623. A switch 625, designated the "record" switch, is provided in series between ground and one side of the relay 620, the other side of the relay 620 being connected through a line 626 (Figs. 14b, 14a and 14f) and through a pair of normally open contacts of a circuit breaker 627 (Fig. 14g) to a (+)75-volt supply. The circuit breaker 627, like the circuit breaker 622, is cam controlled, a cam 628 being provided for this purpose. Thus, when the record switch 625 (Fig. 14b) is closed and when the contacts of circuit breaker 627 are closed by the cam 628, relay 620 is energized and latched, thus latching the contacts 620c in their closed position; and, when the contacts of circuit breaker 622 are closed by the cam 623, the relay 618 will be energized and a (—)100 volts is supplied to the common side of each of the keys 617 of the keyboard, thereby effecting the entry of coordinate data from the keyboard into the counter 573. Additionally, it should be noted that, when the contacts of circuit breaker 627 are closed, a (+)75 volts is applied to the line 569 (Fig. 14f), connected to the line 626 (Fig. 14b), which voltage is adapted to reset the trigger 558 (Fig. 14f) by rendering the tube 561 thereof conductive.

As noted above, the relay 620 (Fig. 14b) is of the latch type, and, when energized its associated contacts are latched in their closed position until the unlatch winding 630 thereof is energized. The winding 630 is connected between a (+)75 volts and a line 631 which, in turn, is connected through a set of normally open contacts of a circuit breaker 632 to ground. A cam 633 is provided to control the continuity of the circuit breaker 632. The timing of the various cams which are used throughout the circuit will be described hereinafter in connection with the timing chart shown in Fig. 22.

Figure 18:
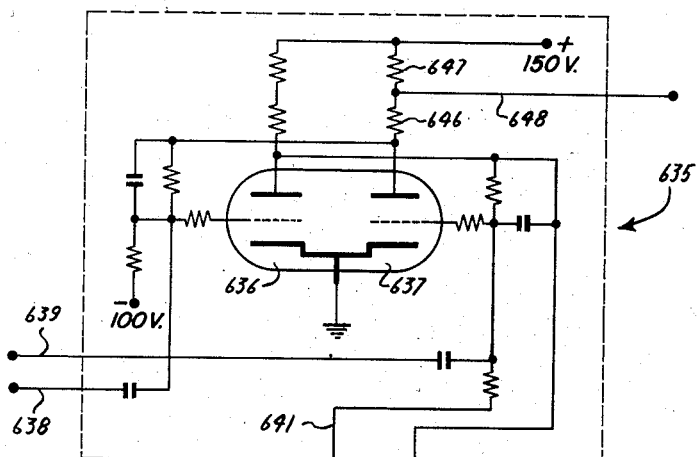
Figure 19:
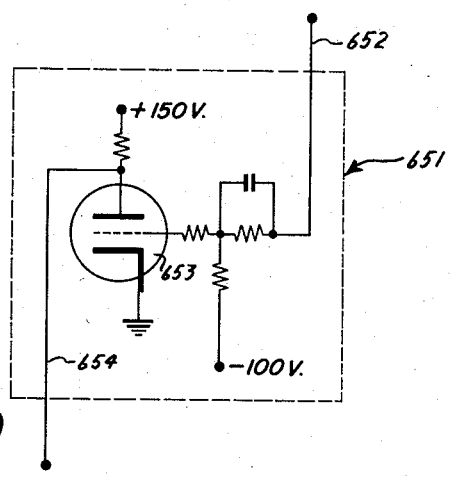

The binary counter 551 (Fig. 14g) comprises ten stages 635, each of which is substantially identical and one of which is shown schematically in Fig. 18. Each stage includes two tubes 636 and 637 and has two conditions of stability, the normal or "off" condition being when tube 637 is conducting and tube 636 is cut off. The grids of the tubes 636 and 637 are coupled through lines 638 and 639, respectively, to a line 640 (Fig. 14g), and the grid of the tube 637 (Fig. 18) is additionally connected to a line 641 which is connected through a line 642 (Figs. 14g, 14f, 14a and 14b) and through a set of normally closed contacts of a circuit breaker 643 to a (—)100 volts. The circuit breaker 643 is controlled by a cam 644 to open at a predetermined time in a given cycle to remove the cutoff bias from each tube 637 (Fig. 18) and to thereby reset each stage 635, if necessary, in its normal condition. The line 642 (Fig. 14b) is additionally connected through the normally closed contacts 620b of the relay 620 to a (—)100 volts and, for a purpose to be explained hereinafter, it will be noted that the binary counter 551 may be reset only if relay 620 is energized and the circuit breaker 643 is open.

As shown in the drawing, the pulses generated by the multivibrator 550 (Fig. 14f) are fed through the line 555 and through the armature and contacts 556a (Fig. 14g) of the aforementioned scale factoring switch 556 to the line 640 of the first stage of the binary counter 551. Assuming that the counter has been reset and that each stage thereof is off, the first pulse received from the multivibrator will turn on the first stage and will thus raise the potential on the plate of tube 637 thereof, since that tube, having been conducting, will be cut off. Provided in the plate circuit of each tube 637 (Fig. 18) is a voltage divider consisting of resistors 646 and 647, and a line 648 connected intermediately thereof is joined to the line 640 of the next succeeding stage, with the exception that the line 648 of the last stage is deleted. The resistors 646 and 647 are of such a value that a positive pulse present on the line 648, due to tube 637 being cut off, is of insufficient magnitude to render the tube 636 of the next succeeding stage conductive; however, when a preceding stage is turned off, the resulting negative pulse on the line 648 is sufficient to reverse the condition of stability of the next succeeding stage. Thus, each pulse generated by the multivibrator will reverse the condition of stability of the first stage of the counter 551; each time the first stage is turned off, i. e., on each second pulse received by the first stage, the second stage is turned on; and each time the second stage is turned off, i. e., on each fourth pulse generated by the multivibrator, the third stage is turned on, etc., as is clear to all familiar with such counters.

When a number of pulses equal to the decimal coded Y coordinate has been generated by the multivibrator, that number will have been converted to and stored in binary form in the counter 551. This is true when the scale factoring switch 556 is in the position shown; however, under certain circumstances, it may be desired to factor the coded input coordinates and it is for this reason that the switch 556 is provided. The contacts 556b, 556c and 556d of the switch 556 are connected to the lines 640 of the second, third and fourth stages, respectively, of the counter 551, and, if the armature of the switch 556 is in engagement with contacts 556b thereof, the multivibrator pulses will be entered directly into the second stage of the counter and the resulting number stored therein in binary form will be double the number of pulses generated, i. e., double the decimal coded value of the Y coordinate. Similarly, if the armature of the switch 556 is in engagement with either of contacts 556c or 556d, the number stored in the binary counter will be 4 or 8 times, respectively, the value of the programmed Y coordinate.

Figure 20:
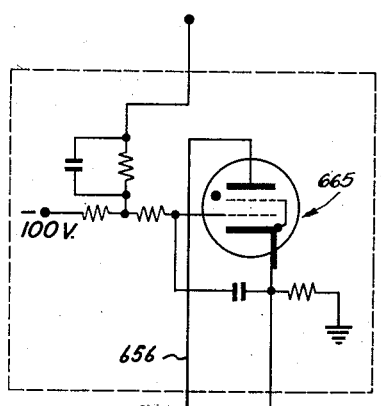
Figure 21:
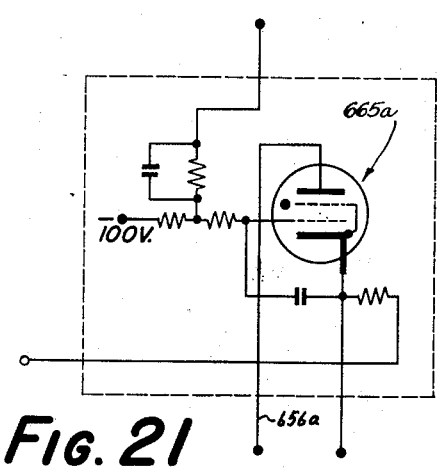

The plate of the tube 636 (Fig. 18) of each stage 635 of the binary counter 551 is connected to the grid of a corresponding buffer amplifier 651 (Figs. 14g and 19) through a line 652, and each amplifier 651 includes a tube 653 (Fig. 19), the plate of which is connected through a line 654 (Fig. 14g) to the control grid of a thyratron 655 (Figs. 20 or 21). The bias supplied to the control grids of each tube 653 (Fig. 19) is sufficient to cut it off only while the plate of the tube 636 of the corresponding stage of the counter 551 is low, due to that stage being on; however, when it is off, the bias is ineffective and the tube 653 is rendered conductive. Similarly, the thyratrons 655 (Figs. 20 or 21) are normally biased below cutoff; however, when an amplifier 651 is cut off, the increase in the plate potential thereof is sufficient to raise the bias on the grid of the associated thyratron above cutoff. Thus, it is obvious that, when one or more of the stages 635 of the binary counter 551 is on, the bias on the control grids of the associated thyratrons is raised in potential sufficiently to permit them to conduct, as will be more fully explained in the text to follow.

Figure 14G:
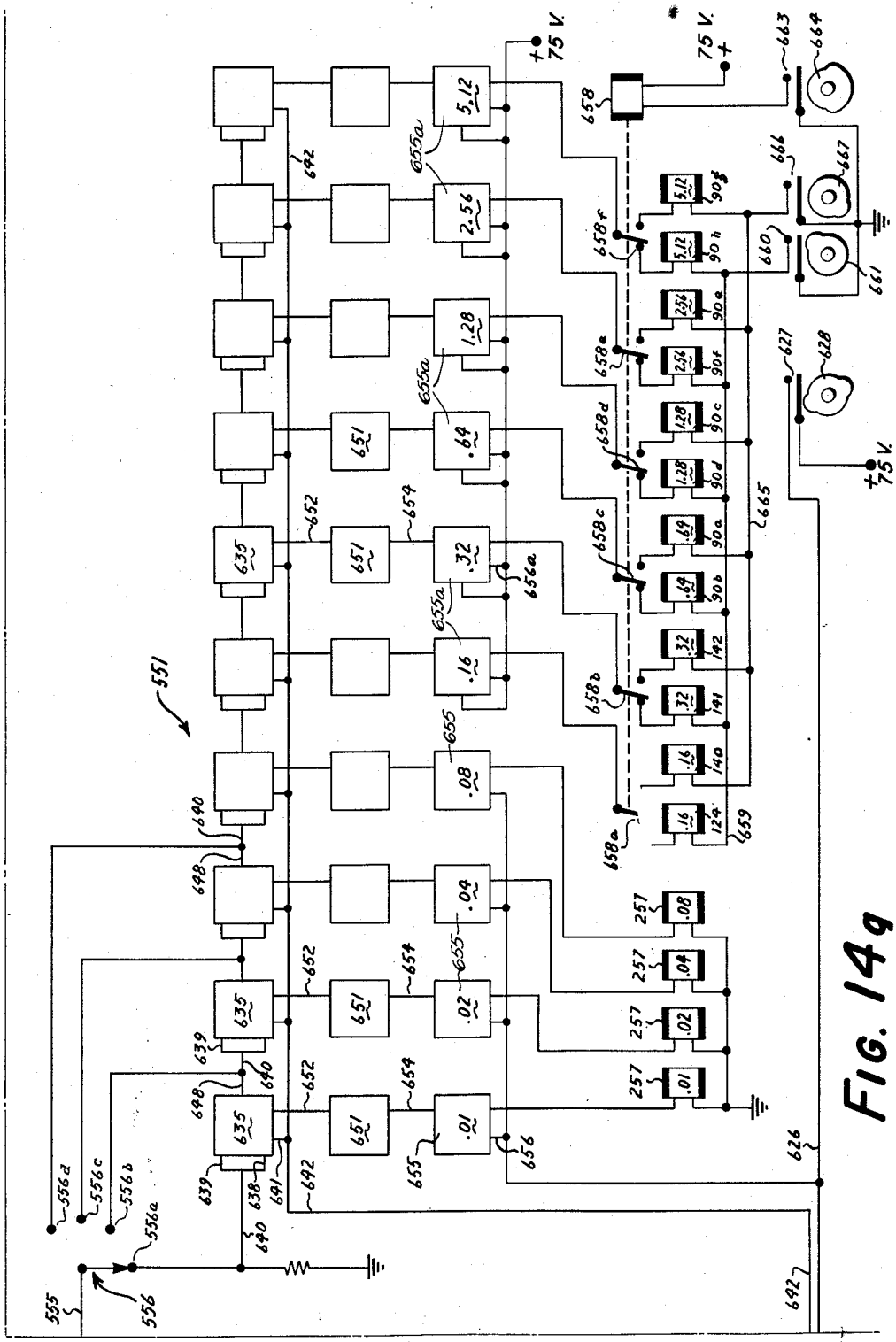
Figure 15:
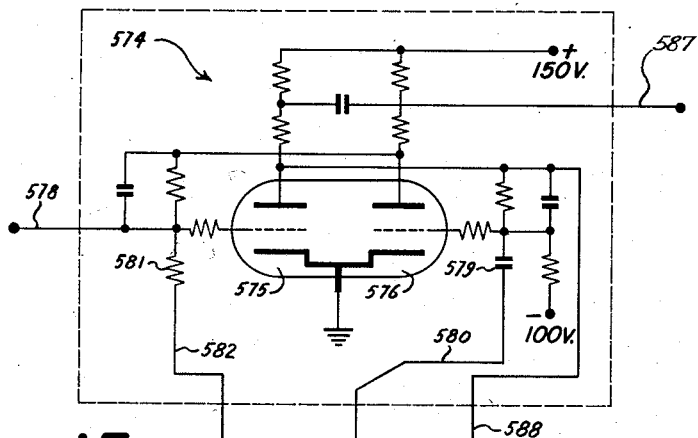

The plates of each of the first four thyratrons 655 (Figs. 14g and 20), designated .01, .02, .04 and .08, respectively, in Fig. 14g, are connected through a line 656 to the line 626, and, when the contacts of the circuit breaker 627 are closed by the cam 628, a (+)75 volts is supplied to the plates of these thyratrons. The plates of the remaining six thyratrons (Figs. 14g and 21) are connected through a line 656a to a (+)75 volts. Each of the aforementioned fine drive interposer magnets 257 is serially connected between ground and the cathode of its associated thyratron. One side of each of the intermediate and coarse drive magnets 124, 141, 90b, 90d, 90f and 90h is connected through normally closed contacts 658a through 658f, respectively, of a relay 658 to the cathode of the corresponding thyratron, and the other side of each said magnet is connected through a line 659 and through the normally open contacts of a circuit breaker 660 to ground. The circuit breaker 660 is controlled by a cam 661. The relay 658 is connected between a (+)75 volts and one side of the normally open contacts of a circuit breaker 663, the other side thereof being connected to ground, and the circuit breaker 663 is controlled by a cam 664. When the relay 658 is energized by the closing of the contacts of the circuit breaker 663, its contacts are transferred and the intermediate and coarse drive magnets 140, 142, 90a, 90c, 90e and 90g are connected between the cathodes of the associated thyratrons 655 and a line 665, which line is connected through the normally open contacts of a circuit breaker 666 to ground. Again, the circuit breaker 666 is controlled by a cam 667.

It should now be clear that, when a number is stored in the binary counter, the thyratrons which correspond to the "on" stages thereof are biased to conduct, and, in the case of the first four thyratrons, they will conduct and thereby energize the corresponding magnets 257 as soon and as long as the circuit breaker 627 is closed by the cam 628, since it is at this time that a (+)75 volts is supplied to the plates of the thyratrons. In the case of the remainder of the thyratrons, the ones corresponding to the "on" stages of the counter will conduct when the contacts of either of the circuit breakers 660 or 666 are closed and will thereby energize the corresponding magnets 124, 141, 90b, 90d, 90f and 90h, or 140, 142, 90a, 90c, 90e and 90g, depending upon whether or not contacts of circuit breaker 663 are open or closed.

*Timing mechanism*

It will be recalled that the shaft 59 (Fig. 3) is continuously driven to drive the gear 67 and sprocket 167 keyed thereto. The gear 67 meshes with and drives the gear 68, the gear ratio therebetween being 2:1, and the sprocket 167 drives the sprocket 165 and a sprocket 365, through the chain 166, the ratio between these sprockets being 2:1:1, respectively. Thus, for each two revolutions of the shaft 59, shaft 69 completes one revolution, shaft 164 completes two revolutions, and a shaft 367 driven by the sprocket 365 completes one revolution. As will become clear, one revolution of the shaft 59 completes one print cycle. During each print cycle, therefore, the cam 70 will rock the arms 72 and 73 from one extreme position to the other, thus moving the arms 107 and 108 from one extreme position to the other. Also, during this time, the cam 163 keyed to the shaft 164 will make one revolution, and the aforementioned timing cams, which are mounted on and driven by the shaft 367, will complete one-half of a revolution.

As noted above, each of the timing cams is provided to operate a circuit breaker, some of which are normally open, the others being normally closed. Each of the cam operated circuit breakers comprises a body portion 368 (Fig. 10) having an arm 369 pivotally attached thereto. The free end of the arm 369 supports cam follower 370 adapted to ride on a track provided by its associated cam. A piece of spring steel 372 is secured to the arm 369 at 373 and is provided at its free end with a suitable fixture 374 formed integrally with the lowermost end of a rod 375 disposed within a vertical passageway 376 provided in the switch body 368. The fixture 374 and rod 375 are composed of an insulating material, and a pair of contacts 377 and 378 are suitably insulated from each other and from the switch housing, the contact 377 being mounted on a piece of spring steel 379 which is biased downwardly to normally maintain the contacts apart. The rod 375 disposed within the passageway 376 is arranged to engage the lower side of the contact 377, and when the follower 370 is in contact with the high portion of the track provided by the cam 371, the member 372 attached to the arm 379 is adapted to push the rod 375 upwardly sufficiently to close the contacts. However, when the follower 370 is riding on a low portion of the cam, the contacts are open as shown in the drawing.

In operation, a character to be printed is entered into the keyboard 285 (Fig. 14a), the Y coordinate of the point at which the character is to be located is entered in the keyboard 616 (Fig. 14b), and the record key 625 is depressed. Referring to the timing diagram (Fig. 22), two print cycles, i. e., one revolution of the cam 70, are shown and are referenced to the rotation of cam 70. It is to be noted, however, that the print cycles are interspersed, and though a character may be printed every 180°, a complete print cycle consumes 360°. To facilitate an understanding of the timing of the machine of the invention, a sequential description of the operation of the various cam controlled circuit breakers is given for one print cycle, the shaded portions of the timing diagram representing that portion of a print cycle during which the associated circuit breakers are closed. Additionally, since each cycle is interspersed with portions of a prior and a succeeding cycle, the letter "Q" will be used to identify the present cycle, the letter "P" will be used to identify the cycle immediately preceding the Q cycle, and the letter "R" will be used to identify the cycle immediately following the Q cycle.

1st—The first effective occurrence regarding the Q cycle, after the address and character information is entered into the keyboards and after the record key 625 is depressed, is the closing of the contacts of the circuit breaker 627 (Fig. 14g) by the cam 628. When the record key 625 (Fig. 14b) is closed and when the contacts of the circuit breaker 627 are closed, 75 volts is placed across the latch relay 620, thereby energizing it and locking its contacts down. Also, at this time, 75 volts is applied through the contacts of the circuit breaker 627 and through the line 626 to the line 569, leading to the trigger 558 (Fig. 14f), thereby resetting it, and to the line 656 (Fig. 14g) connected to the plates of each of the line .01, .02, .04 and .08 thyratrons 655, thereby completing the plate circuits of these thyratrons. When the plate circuits of these thyratrons, i. e., the fine drive thyratrons, are completed, the fine drive information, if any, present in the binary counter from the P cycle is entered into the fine drive magnets 257. Thus, by the time the circuit breaker 627 is reopened, the trigger 558 is reset, the relay 620 is latched down, and the P fine drive information present in the binary counter is entered into the fine drive magnets 257.

2nd—During the time that the contacts of the circuit breaker 627 are closed by the cam 628, the cam 301 is arranged to close and reopen the contacts of the circuit breaker 302, to energize the latch windings 303 of each of the twelve character storage relays 292 and thereby erase the character, if any, stored therein for the P cycle, and upon reopening of these contacts, the storage relays 292 are in condition for the receipt of character information to be stored therein for the Q cycle.

3rd—Immediately following the reopening of the contacts of the circuit breaker 302, the cam 623 is arranged to close the contacts of the circuit breaker 622, and, since the contacts 620c of the relay 620 are latched closed, 75 volts is placed across the relay 618 and its contacts are picked up for the period during which the circuit breaker 622 is closed. Energization of the relay 618 places a (—)100 volts on the common side of the keys 617 of the keyboard 616, and, as described above, the stages of the ring counter 573 corresponding to depressed address keys 617 are turned on, thereby entering the coordinate data relating to the Q cycle into the ring counter. In addition to entering the coordinate data into the ring counter, energization of the relay 618 places 75 volts on the line 294, through the contacts 618d, which in turn places 75 volts across the character storage relays 292 (Fig. 14a) associated with depressed keys 285a of the character entry keyboard 285. Thus, when the circuit breaker 622 is closed by the cam 623, and when relay 620 is energized, the Q data in the keyboards 285 and 616 are entered into the character storage relays 292 and into the ring counter, respectively. It should be noted, however, that the relay 618 is not energized, and thus that the information is not read out of the two keyboards, unless the relay 620 is latched down as described above.

4th—As soon as the circuit breaker 622 is again opened, the cam 644 (Fig. 14b) is arranged to open the normally closed circuit breaker 643. It will be recalled that a (—)100 volts is normally applied through the circuit breaker 643 and through lines 642 and 641 (Fig. 14g) to the control grids of each tube 637 of each stage 635 of the binary counter, and removal of this 100-volt bias from the grids of these tubes will render them conductive and thereby reset them in their normal condition. As was described above, however, the mere opening of circuit breaker 643 is not enough in itself to reset the binary counter 551, since the line 642 is additionally connected through the normally closed contacts 620b of the relay 620 (Fig. 14b) to a (—)100 volts. Thus, the binary counter is reset if, and only if, the relay 620 is latched down and the circuit breaker 643 is open. In this way, the binary counter is not reset unless the record key 625 was depressed in sufficient time to permit energization of the relay 620 immediately prior to the closing of circuit breaker 643, and it should be clear that the print head 11 is not returned to zero after each character is printed but will remain at the location of the last printed character until the record key is again depressed. To continue with the description of the present cycle, the binary counter is reset when the circuit breaker 643 is opened since the contacts 620b of the relay 620 are latched open and the counter is readied for the receipt of the Q coordinate data.

5th—The next occurrence in the Q cycle is the energization of the keyboard restore magnet 286 (Fig. 14a) due to the closing of the contacts of the circuit breaker 289 by the cam 291, since the contacts 620d of the relay 620 have been closed. This operation erases from the keyboard the Q character data which are now stored in the storage relays 292 and clears the keyboard for receipt of the R character data. If, as is not the case here, the relay 620 were not latched down, or if the switch 287 were open, the closing of the circuit breaker 289 would have no effect on the character keyboard, and the keyboard, like the binary counter, remains unaffected upon the closing of the associated circuit breaker, unless the relay 620 is latched down. It should now be obvious that, when it is desired for some reason to print the same character at several points, the character need be entered in the keyboard 285 only once and the switch 287 opened. In this way, the keyboard is not reset each cycle and the character entered therein will be reprinted during successive cycles, as is desired.

6th—Just after the contacts of the circuit breaker 289 are closed, the cam 664 is operative to close the contacts of the circuit breaker 663 to thereby place the coarse and intermediate drive magnets 140, 142, 90a, 90c, 90e and 90g in the thyratron circuits and remove the magnets 124, 141, 90b, 90d, 90f and 90h therefrom. This is in preparation for the printing of the P character.

7th—A cam 385 (Fig. 14b) is provided to next operate a pair of normally open contacts of a circuit breaker 386, and, if at this time the relay 620 is latched down, as it is, a (+)75 volts is applied through the contacts 620a and through the line 568 to the control grid of the tube 562 (Fig. 14f) of the trigger 558 to thereby reverse its condition of stability, and, as above described, to cause the multivibrator 550 to be turned on. Conversion of the Q coordinate data, already present in the ring counter, to the binary form required by the drive magnets is thus started when the circuit breaker 386 is closed, if the contacts 620a are closed; however, if the relay 620 is not latched down, the multivibrator is not turned on.

8th—Shortly after the contacts of circuit breaker 386 are again opened, the cam 633 is adapted to close the contacts of the circuit breaker 632, to ground one side of the latch winding 630 of the relay 620, thereby energizing it and permitting the contacts associated with the relay 620 to return to their normal position.

9th—Next, a cam 388 is provided to close the contacts of a circuit breaker 389 to place 75 volts across the magnet 315 (Fig. 11) and to thereby release the shaft 305 for one revolution. The contacts of the circuit breaker 389 are arranged to close in time to enable the actual printing to take place at 180°, as indicated in Fig. 22. The character printed at this time is the P character.

10th—Shortly after the print cycle is commenced by the closing of the circuit breaker 389, the coarse and intermediate drive magnets 140, 142, 90a, 90c, 90e and 90g (Fig. 14g) are connected to ground through the circuit breaker 666, due to the action of the cam 667, and those of these magnets that are associated with the "on" stages of the binary counter are energized at this time. It should be noted that these magnets are grounded for a short time before and after the 180° point, and that at the 180° point the arms 72, 73, 107 and 108 are at one extreme position, the cam 70 being arranged to maintain these arms at each extreme position for a short period of time, as indicated in Fig. 22. During this time, the coarse drive magnets which correspond to "on" stages of the binary counter are energized, and the associated tape displacement rollers 97 are released to ride in the notches 103 provided therefor in the corresponding arm 72 or 73. Also, the intermediate drive magnets which correspond to "on" stages of the binary counter are energized, thereby releasing the associated arms, and tape displacement rollers carried thereby, to permit the coarse and intermediate relocation of the print head 11 according to the Q character coordinates when the arms are moved by the cam 70 to the other extreme position. At this time, therefore, the coarse and intermediate drive data for the Q cycle are taken from the binary counter and are entered into their respective magnets; the fine drive data are entered later, as will become clear. Additionally, the cam 163 is arranged to permit the arm 160 to abut the fine drive control rod 171 for several degrees on each side of the 180° point, the fine drive control rod having been positioned according to the P coordinate data during the above described 1st step. While the arms 72, 73, 107 and 108 are at one extreme, i. e., at the 180° point, and the arm 160 is adjacent the rod 171, the print head is in the position controlled by the P coordinates and is set to record the P data. If no data were entered during the P cycle, neither the binary counter nor the character keyboard 285 was restored and the head will remain at the address of the last character that was entered, the wire printer being arranged to merely re-record the last character recorded.

11th—The next occurrence is the resetting of the ring counter 573 (Figs. 14c, 14d and 14e) in preparation for the receipt of the R coordinate data. It will be recalled that the grid of each tube 575 (Fig. 15) of each stage 574 of the ring counter is normally connected through a line 583 and a normally closed circuit breaker 584 to a (—)100 volts. At this time in the cycle, however, the cam 585 is arranged to open the circuit breaker 584, to thereby remove the bias from the tubes 575 and permit them to conduct, thus resetting each stage of the ring counter and clearing it for the entry of the R coordinate data.

12th—At the 180° point, the cam 299 (Fig. 14a) is arranged to close the circuit breaker 297 to place 75 volts on the common side of the contacts associated with the character storage relays 292, to permit energization of the print magnets 298 corresponding to the latched storage relays, thereby entering the Q character into the print magnets.

13th—The cam 628 is provided with two rises and is adapted to close the circuit breaker 627 twice for each revolution thereof, at 180° intervals. As mentioned above in this connection, when the circuit breaker 627 is closed, the trigger 558 (Fig. 14f) is reset, 75 volts is connected to one side of the latch relay 620 (Fig. 14b) and the plate circuits of the fine drive thyratrons 655 (Fig. 14g) are completed through the fine drive magnets 257. At this time, therefore, the fine drive coordinate data for the Q character are entered into the fine drive magnets 257, the trigger 558 is reset for the R cycle, and the relay 620 is picked up if the record key was depressed for the R cycle.

14th—A second rise provided on the cam 301 is arranged to again close the circuit breaker 302 to energize the latch windings of the storage relays to thereby erase the Q character stored therein and ready the storage relays for the receipt of the R character.

15th—The cam 623 is also provided with two rises, the second of which is arranged to again close the circuit breaker 622 at this time, and, assuming that the record key was depressed for the R cycle, the relay 620 is picked up, thus energizing relay 618 and entering the R coordinate and character data from the keyboards into the ring counter and storage relays.

16th—As soon as the circuit breaker 622 is again opened, the cam 644 is arranged to again open the circuit breaker 643, and, since it has been assumed that the relay 620 is latched for the R cycle, the binary counter is reset, as described above, for the receipt of the R coordinate data.

17th—Shortly after the binary counter is reset, the character keyboard 285 is reset, due to the reclosing of the circuit breaker 289 by the second rise provided on the cam 291, to remove the Q character therefrom and ready it for the receipt of the R character.

18th—The circuit breaker 289 is now reopened, to place the intermediate and coarse drive magnets 124, 141, 90b, 90d, 90f and 90h in the thyratron circuits and remove the magnets 140, 142, 90a, 90c, 90e and 90g therefrom.

19th—The circuit breaker 386 is again closed by the second rise provided in the cam 385 to again turn the trigger 558 on and thereby commence the conversion of the R coordinate data, since it is assumed that the relay 620 is latched down for the R cycle.

20th—Relay 620 is next unlatched due to the reclosing of the circuit breaker 632 by the second rise provided in the cam 633.

21st—The cam 388 again closes the circuit breaker 389 to energize the print magnets so that the printing of the Q character will be accomplished at the 360° point.

22nd—As soon as the print magnets are de-energized, the single rise provided on the cam 661 is arranged to close the circuit breaker 660 to complete the intermediate and coarse drive thyratron circuits for energization of their respective magnets according to the R coordinate data.

23rd—The ring counter is again reset, due to the opening of the circuit breaker 584 by the cam 585, and is in condition for the receipt of the coordinate data of the cycle next following the R cycle.

24th—At the 360° point, the arms 72, 73, 107 and 108 are at their other extreme position, the arms 160 are adjacent the dwells provided on the cams 163, and the tapes 26 and 46 are displaced sufficiently to position the print head according to the Q coordinates. It is at this time that the Q character is actually printed, since at this time the code plate 283 (Fig. 11) is arranged to strike the print wires 281 to imprint the Q character on the record.

It should now be clear that the apparatus is adapted, upon the entry therein of a character to be printed along with the address of the location at which the character is to be printed, to position the print head at the programmed address and to record the character at the programmed position.

The two keyboards 616 and 285 have been shown, by way of illustration, to describe the operation of the machine of the invention. Although it is true that the machine may be satisfactorily operated for many purposes in this manner, it will be obvious to those skilled in the art that any one of several different automatic programming devices may be utilized to program the machine. For example, a tape reader 685, such as the one disclosed diagrammatically in Fig. 23, may be employed. Such a reader may comprise a tape roller 686, two portions 687 and 688 of which are suitably insulated from each other and each of which is composed of a suitable conducting material. The reader is provided with 72 brushes 689, 60 of which cooperate with the common section 687 and each of which is connected to the corresponding stages of each of the 60 stages of the two ring counters, only one of which has been described above. The common section 687 of the roller 686 is suitably connected to the common side of the keys of the coordinate keyboard 616 and, when a circuit is completed between any one of the 60 brushes 689 and the common section 687, the corresponding stage of one of the ring counters will be turned on.

Each of the remaining 12 brushes 689 cooperating with the section 688 of the roller 686 is suitably connected to the non-common side of the corresponding character storage relay 292, the common section 688 of the roller 686 being connected to ground, and it will be understood that the completion of a circuit between one or more of the 12 brushes 689 and the common section 688 will effect the energization of one or more of the 12 character storage relays 292. It will now be obvious that a character to be printed may be programmed on the tape 690, in the Hollerith code, in the form of punched holes, and that the address of the location at which the character is to be printed may be similarly programmed by means of punched holes at the proper locations on the tape. Each character and address thereof is punched in a line across the tape, and as the tape is advanced beneath the brushes, the machine is automatically programmed. When used in this manner, it is only necessary that the record key 625 be maintained closed and that the tape be fed through the reader at a speed not in excess of the capability of the machine. It should be noted, however, that the tape speed need not be synchronized with the machine since the machine is asynchronous and will accept information during any portion of each cycle.

It will now be clear that the machine of the invention may be programmed by means such as the tape described above to print selected characters at given addresses, and is useful, for example, for automatically filling in the blanks provided on printed forms according to the programmed information. In addition to being used solely as a printer, it will now be obvious that the novel machine may be used as a plotter for illustrating information graphically, since the print head is positioned according to the two coordinates included in a given address.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A data recording machine comprising a data recording head disposed adjacent a planar recording surface for traversing said surface in a plane parallel thereto, means for selectively positioning said head relative to said surface, and means associated with said head for recording data on said surface at a point adjacent a selected position of said head, said positioning means including a flexible member connected at one end to said head for movement therewith, said member being fixed at the other end to resist movement of said head, means for displacing said member intermediately of its ends for effecting displacement of said head relative to said surface, and means for controlling the degree of displacement effected by said displacing means, whereby the selective positioning of said head relative to said recording surface may be achieved.

2. In combination, a data recording surface, means for supporting said surface, a data recording head, means for movably supporting said head adjacent said surface, and means for adjustably positioning said head relative to said surface, said positioning means comprising an elongated member which is flexible laterally but which is rigid lengthwise, said member having a first portion secured to said surface supporting means, means associated with a second portion of said member for yieldably urging it away from said first portion, said data recording head being operatively connected to said member intermediately of its first and second portions, means normally effective to displace said member laterally between said first portion and said head, and means operative in response to a signal received for rendering said displacement means ineffective, whereby said head is repositioned relative to said surface.

3. The invention set forth in claim 2 wherein said last mentioned means is operable in response to different signals to render said displacing means ineffective in varying predetermined degrees, the degree to which it is rendered ineffective being controlled by the particular signal received, with the further provision of means for selectively creating signals corresponding to the different degrees of displacement, whereby said head may be selectively positioned relative to said recording surface.

4. In a data recording machine wherein a data recording head is automatically positioned adjacent selected portions of a document determined by information programmed in the machine and is arranged to record data on the selected portions, the combination of a web having one end operatively associated with said head for movement therewith, a second end of said web being fixedly anchored relative to said head, means for maintaining said web in tension, means for displacing portions of said web intermediately of said ends in different predetermined amounts to move said data recording head to different predetermined positions, means responsive to programmed information for controlling said displacing means to displace said web an amount determined by said programmed information, and means associated with said data recording head operable to record data on a document when said head is in a programmed position.

5. The invention set forth in claim 4 wherein said displacing means includes a plurality of guide members, said web being arranged adjacent each of said guide members, and said control means being arranged to move certain of said guide members determined by said programmed information to effect the displacement of said web and to thereby move said head to a position corresponding to said programmed information.

6. A data recording machine comprising a print head, means for supporting said head for movement in a plane substantially parallel to a recording surface, means for selectively moving said head relative to said surface to position it adjacent a selected portion thereof, said moving means including a member having a first portion connected to said head for movement therewith, a second portion fixedly anchored to resist movement of said head and means for selectively displacing said member intermediately of said first and second portions for selectively positioning said head relative to said surface, means carried by said head for printing a selected one of several characters when actuated, means for selecting a character to be printed, and means for actuating said printing means, whereby said machine may be programmed to automatically print selected characters on selected portions of said recording surface.

7. In a machine for printing selected characters at predetermined locations on a reocrd, the combination of means for supporting a record, a print head mounted adjacent said supporting means, said head being supported for movement transversely and longitudinally of said supporting means, printing means associated with said head, said printing means being normally inoperative but arranged when operative to print characters on a record disposed on said supporting means at a location thereon determined by the position of said head relative to said supporting means, means for positioning said head relative to said supporting means, said positioning means including a flexible connector extending between said head and said supporting means and means for displacing said connector intermediately of said head and said supporting means for effecting the displacement of said head, means for selecting a character to be printed, means for rendering said printing means operative to print said selected character, and control means operative upon receipt of information relating to a character address and to the identity of a character to be printed for controlling the degree of displacement of said flexible connector to position said head adjacent said supporting means at a point determined by said character address information and for controlling said character selecting means to select a character according to said character identity information.

8. A data recording machine comprising a recording surface, a pair of cross rods supported for lateral movement in planes parallel to said surface, a recording head slidably mounted on each of said rods at their point of intersection in such a way that when said rods are moved said head follows said point of intersection, means for selectively positioning said rods for positioning said head adjacent selected portions of said surface, said positioning means comprising a member having a first portion connected to one of said rods for movement therewith and a second portion fixedly anchored to resist movement of said rod, and means for selectively displacing said member intermediately of said first and second portions for moving said rod whereby said head is selectively positioned relative to said surface.

9. A data recording machine comprising a recording surface, a recording head, means for supporting said head adjacent said surface for movement relative thereto, said supporting means comprising two mutually perpendicular rods arranged in planes parallel to said surface, said head being slidably mounted on each of said rods, means for selectively positioning said rods relative to said surface for selectively positioning said head relative to said surface, said positioning means including an elongated member connected at one end to one of said rods for displacement therewith, the other end thereof being fixed against displacement with said rod, said elongated member being flexible laterally but not yieldable in tension, means for maintaining said elongated member in tension, and means for displacing said elongated member intermediately of its ends for effecting the displacement of said recording head.

10. The invention set forth in claim 9 with the further provision that said displacing means is arranged to displace said elongated member in different degrees to displace said recording head in different increments and includes means for controlling the degree of displacement of said elongated member.

11. A data recording machine comprising a recording surface, a first member supported adjacent said surface for lateral movement along a first path in a plane parallel thereto, a second member extending across said first member and supported for lateral movement in a second plane parallel to said surface and along a second path perpendicular to said first path, a recording head supported by said members adjacent said surface and arranged to record data on a portion thereof adjacent thereto, said head being arranged to follow the point of intersection of said members, means for selectively moving said members along said first and second paths for selectively positioning said head relative to said surface, said moving means including a flexible connector affixed at one end to one of said members for movement therewith and at the other end to a supporting structure to resist the movement of said member, means for displacing said connector intermediately of its ends for effecting the displacement of said head, and means for controlling the degree of displacement of said flexible connector according to the address of data to be recorded.

References Cited in the file of this patent

UNITED STATES PATENTS

| | | |
|---|---|---|
| 638,092 | Carmona | Nov. 28, 1899 |
| 1,706,238 | Lempereur et al. | Mar. 19, 1929 |
| 2,129,065 | Loop | Sept. 6, 1938 |
| 2,278,409 | Armbruster | Apr. 7, 1942 |
| 2,287,072 | Townsend | June 23, 1942 |
| 2,651,400 | Young et al. | Sept. 8, 1953 |
| 2,671,548 | Anderson | Mar. 9, 1954 |
| 2,708,020 | Wockenfuss | May 10, 1955 |
| 2,727,944 | Howard | Dec. 20, 1955 |

FOREIGN PATENTS

| | | |
|---|---|---|
| 523,698 | Germany | Aug. 21, 1933 |